United States Patent
Johnson et al.

(10) Patent No.: US 11,597,084 B2
(45) Date of Patent: Mar. 7, 2023

(54) CONTROLLING ROBOT TORQUE AND VELOCITY BASED ON CONTEXT

(71) Applicant: The Charles Stark Draper Laboratory, Inc., Cambridge, MA (US)

(72) Inventors: David M. S. Johnson, Cambridge, MA (US); Syler Wagner, Somerville, MA (US); Steven Lines, Brookline, MA (US)

(73) Assignee: The Charles Stark Draper Laboratory, Inc., Cambridge, MA (US)

( * ) Notice: Subject to any disclaimer, the term of this patent is extended or adjusted under 35 U.S.C. 154(b) by 18 days.

(21) Appl. No.: 16/570,736

(22) Filed: Sep. 13, 2019

(65) Prior Publication Data

US 2020/0086482 A1    Mar. 19, 2020

Related U.S. Application Data

(60) Provisional application No. 62/731,398, filed on Sep. 14, 2018, provisional application No. 62/730,947, (Continued)

(51) Int. Cl.
*B25J 9/16* (2006.01)
*B25J 9/00* (2006.01)
(Continued)

(52) U.S. Cl.
CPC ........... *B25J 9/1666* (2013.01); *B25J 9/0009* (2013.01); *B25J 9/16* (2013.01); *B25J 9/161* (2013.01);
(Continued)

(58) Field of Classification Search
CPC ...... B25J 9/1666; B25J 9/1633; B25J 9/1653; B25J 9/1664; B25J 9/1674; B25J 9/1676;
(Continued)

(56) References Cited

U.S. PATENT DOCUMENTS 4,512,709 A   4/1985  Hennekes
4,513,709 A   4/1985  Hennekes
(Continued)

FOREIGN PATENT DOCUMENTS

CN   107092209 A   8/2017
EP       138461 A2   4/1985
(Continued)

OTHER PUBLICATIONS

Anandan, T.M., "The Shrinking Footprint of Robot Safety", Robotics Online, Oct. 6, 2014. https://www.robotics.org/content-detail.cfm/Industrial-Robotics-Industry-Insights/The-Shrinking-Footprint-of-Robot-Safety/content_id/5059.

(Continued)

*Primary Examiner* — Ian Jen
*Assistant Examiner* — Dylan Brandon Mooney
(74) *Attorney, Agent, or Firm* — Hamilton, Brook, Smith & Reynolds, P.C.

(57) ABSTRACT

In an embodiment, a method includes identifying a force and torque for a robot to accomplish a task and identifying context of a portion of a movement plan indicating motion of the robot to perform the task. Based on the identified force, torque, and context, a context specific torque is determined for at least one aspect of the robot while the robot executes the portion of the movement plan. In turn, a control signal is generated for the at least one aspect of the robot to operate in accordance with the determined context specific torque.

19 Claims, 6 Drawing Sheets

Related U.S. Application Data filed on Sep. 13, 2018, provisional application No. 62/730,933, filed on Sep. 13, 2018, provisional application No. 62/730,934, filed on Sep. 13, 2018, provisional application No. 62/730,918, filed on Sep. 13, 2018, provisional application No. 62/730,703, filed on Sep. 13, 2018.

(51) Int. Cl.

| | | |
|---|---|---|
| *B25J 13/00* | (2006.01) | |
| *B25J 13/08* | (2006.01) | |
| *G06N 3/08* | (2023.01) | |
| *G10L 15/22* | (2006.01) | |
| *B65G 1/137* | (2006.01) | |
| *B25J 15/00* | (2006.01) | |
| *G06Q 10/0631* | (2023.01) | |
| *B25J 11/00* | (2006.01) | |
| *B25J 15/04* | (2006.01) | |
| *B25J 19/02* | (2006.01) | |
| *G05D 1/02* | (2020.01) | |
| *B25J 19/00* | (2006.01) | |
| *G06V 40/20* | (2022.01) | |
| *H04L 67/12* | (2022.01) | |
| *G05B 19/4061* | (2006.01) | |
| *A47J 44/00* | (2006.01) | |

(52) U.S. Cl.
CPC .......... *B25J 9/1633* (2013.01); *B25J 9/1653* (2013.01); *B25J 9/1664* (2013.01); *B25J 9/1674* (2013.01); *B25J 9/1676* (2013.01); *B25J 9/1682* (2013.01); *B25J 9/1687* (2013.01); *B25J 9/1697* (2013.01); *B25J 11/0045* (2013.01); *B25J 13/003* (2013.01); *B25J 13/085* (2013.01); *B25J 13/088* (2013.01); *B25J 15/0052* (2013.01); *B25J 15/0408* (2013.01); *B25J 19/0083* (2013.01); *B25J 19/023* (2013.01); *B65G 1/137* (2013.01); *G05D 1/02* (2013.01); *G06N 3/08* (2013.01); *G06Q 10/06316* (2013.01); *G06V 40/28* (2022.01); *G10L 15/22* (2013.01); *A47J 44/00* (2013.01); *G05B 19/4061* (2013.01); *G05B 2219/32335* (2013.01); *G05B 2219/39001* (2013.01); *G05B 2219/39091* (2013.01); *G05B 2219/39319* (2013.01); *G05B 2219/39342* (2013.01); *G05B 2219/39468* (2013.01); *G05B 2219/40201* (2013.01); *G05B 2219/40202* (2013.01); *G05B 2219/40411* (2013.01); *G05B 2219/40497* (2013.01); *G05B 2219/45111* (2013.01); *G05B 2219/49157* (2013.01); *G05B 2219/50391* (2013.01); *H04L 67/12* (2013.01)

(58) Field of Classification Search
CPC .. B25J 11/0045; B25J 13/085; B25J 15/0052; B25J 19/023; B25J 9/0009; B25J 9/16; B25J 9/161; B25J 9/1682; B25J 9/1687; B25J 9/1697; B25J 13/003; B25J 13/088; B25J 15/0408; B25J 19/0083; G06N 3/08; G06Q 10/06316; G05B 19/4061; G05B 2219/32335; G05B 2219/39001; G05B 2219/39091; G05B 2219/49157; G05B 2219/39319; G05B 2219/39342; G05B 2219/39468; G05B 2219/40201; G05B 2219/40202; G05B 2219/40411; G05B 2219/40497; G05B 2219/45111; G05B 2219/50391; B65G 1/137; G05D 1/02; G06V 40/28; G10L 15/22; A47J 44/00; H04L 67/12

See application file for complete search history.

(56) References Cited

U.S. PATENT DOCUMENTS

| | | |
|---|---|---|
| 4,604,787 A | 8/1986 | Silvers |
| 4,611,377 A | 9/1986 | McCormick |
| 4,624,043 A | 11/1986 | Bennett |
| 4,676,142 A | 6/1987 | McCormick |
| 4,875,275 A | 10/1989 | Hutchinson et al. |
| 4,896,357 A | 1/1990 | Hatano |
| 4,904,514 A | 2/1990 | Morrison et al. |
| 5,018,266 A | 5/1991 | Hutchinson et al. |
| 5,044,063 A | 9/1991 | Voellmer |
| 5,131,706 A | 7/1992 | Appleberry |
| 5,136,223 A | 8/1992 | Karakama |
| 5,360,249 A | 11/1994 | Monforte et al. |
| 5,396,346 A | 3/1995 | Nakayama |
| 5,774,841 A | 6/1998 | Salazar et al. |
| 5,879,277 A | 3/1999 | Dettman et al. |
| 6,223,110 B1 | 4/2001 | Rowe et al. |
| 6,427,995 B1 | 8/2002 | Steinwall |
| 6,569,070 B1 | 5/2003 | Harrington et al. |
| 6,678,572 B1 | 1/2004 | Oh |
| 8,095,237 B2 | 1/2012 | Habibi et al. |
| 9,186,795 B1 * | 11/2015 | Edsinger ............... B25J 9/1633 |
| 9,189,742 B2 | 11/2015 | London |
| 9,259,840 B1 | 2/2016 | Chen |
| 9,346,164 B1 | 5/2016 | Edsinger et al. |
| 9,427,876 B2 | 8/2016 | Mozeika et al. |
| 9,615,066 B1 | 4/2017 | Tran et al. |
| 9,621,984 B1 | 4/2017 | Chu |
| 9,659,225 B2 | 5/2017 | Joshi et al. |
| 9,744,668 B1 | 8/2017 | Russell et al. |
| 9,547,306 B2 | 10/2017 | Sepulveda |
| 9,800,973 B1 | 10/2017 | Chatot et al. |
| 9,801,517 B2 | 10/2017 | High et al. |
| 10,131,053 B1 | 11/2018 | Sampedro et al. |
| 10,427,306 B1 | 10/2019 | Quinlan et al. |
| 11,016,491 B1 | 5/2021 | Millard |
| 11,116,593 B2 | 9/2021 | Hashimoto et al. |
| 11,351,673 B2 | 6/2022 | Zito et al. |
| 2002/0144565 A1 | 10/2002 | Ambrose |
| 2002/0151848 A1 | 10/2002 | Capote et al. |
| 2002/0158599 A1 | 10/2002 | Fujita |
| 2002/0181773 A1 | 12/2002 | Higaki et al. |
| 2003/0060930 A1 | 3/2003 | Fujita |
| 2004/0039483 A1 | 2/2004 | Kemp et al. |
| 2004/0172380 A1 | 9/2004 | Zhang |
| 2005/0004710 A1 | 1/2005 | Shimomura et al. |
| 2005/0193901 A1 | 6/2005 | Buehler |
| 2005/0171643 A1 | 8/2005 | Sabe et al. |
| 2005/0283475 A1 | 12/2005 | Beranik |
| 2006/0137164 A1 | 6/2006 | Kraus |
| 2006/0141200 A1 | 6/2006 | D'Amdreta |
| 2006/0165953 A1 | 7/2006 | Castelli |
| 2007/0233321 A1 | 10/2007 | Suzuki |
| 2007/0274812 A1 | 11/2007 | Ban et al. |
| 2007/0276539 A1 | 11/2007 | Habibi et al. |
| 2008/0059178 A1 | 3/2008 | Yamamoto et al. |
| 2008/0161970 A1 | 7/2008 | Adachi et al. |
| 2008/0177421 A1 | 7/2008 | Cheng et al. |
| 2008/0201016 A1 | 8/2008 | Finlay |
| 2008/0237921 A1 | 10/2008 | Butterworth |
| 2009/0075796 A1 | 3/2009 | Doll |
| 2009/0292298 A1 | 11/2009 | Lin et al. |
| 2010/0114371 A1 | 5/2010 | Tsusaka et al. |
| 2010/0292707 A1 | 11/2010 | Ortmaier |
| 2011/0060462 A1 * | 3/2011 | Aurnhammer ......... B25J 9/1674 |
| | | 700/255 |
| 2011/0125504 A1 | 5/2011 | Ko et al. |
| 2011/0238212 A1 | 9/2011 | Shirado et al. |
| 2011/0256995 A1 | 10/2011 | Takazakura et al. |
| 2012/0016678 A1 | 1/2012 | Gruber |
| 2012/0255388 A1 | 10/2012 | McClosky |

(56) References Cited

U.S. PATENT DOCUMENTS

| | | | |
|---|---|---|---|
| 2012/0290134 A1 | 11/2012 | Zhao et al. | |
| 2013/0079930 A1* | 3/2013 | Mistry | G05B 19/00 |
| | | | 700/261 |
| 2013/0103198 A1 | 4/2013 | Nakamoto et al. | |
| 2013/0103918 A1 | 4/2013 | Dictos | |
| 2014/0067121 A1 | 3/2014 | Brooks | |
| 2014/0163736 A1 | 6/2014 | Azizian et al. | |
| 2014/0316636 A1 | 10/2014 | Hong et al. | |
| 2015/0032260 A1 | 1/2015 | Yoon et al. | |
| 2015/0051734 A1 | 2/2015 | Zheng | |
| 2015/0052703 A1 | 2/2015 | Lee et al. | |
| 2015/0114236 A1 | 4/2015 | Roy | |
| 2015/0117156 A1 | 4/2015 | Xu et al. | |
| 2015/0148953 A1 | 5/2015 | Laurent et al. | |
| 2015/0149175 A1 | 5/2015 | Hirata et al. | |
| 2015/0178953 A1 | 5/2015 | Laurent | |
| 2015/0277430 A1 | 10/2015 | Linnell et al. | |
| 2015/0375402 A1 | 12/2015 | D Andreta | |
| 2016/0016315 A1 | 1/2016 | Kuffner et al. | |
| 2016/0073644 A1 | 3/2016 | Dickey | |
| 2016/0075023 A1* | 3/2016 | Sisbot | G01S 5/0072 |
| | | | 700/255 |
| 2016/0103202 A1 | 4/2016 | Sumiyoshi et al. | |
| 2016/0291571 A1 | 10/2016 | Cristiano | |
| 2016/0372138 A1 | 12/2016 | Shinkai et al. | |
| 2017/0004406 A1* | 1/2017 | Aghamohammadi | |
| | | | G06N 20/00 |
| 2017/0080565 A1 | 3/2017 | Dalibard | |
| 2017/0087722 A1* | 3/2017 | Aberg | B25J 9/1676 |
| 2017/0133009 A1 | 5/2017 | Cho et al. | |
| 2017/0168488 A1 | 6/2017 | Wierzynski | |
| 2017/0178352 A1 | 6/2017 | Harmsen et al. | |
| 2017/0326728 A1 | 11/2017 | Prats | |
| 2017/0334066 A1 | 11/2017 | Levine | |
| 2017/0354294 A1 | 12/2017 | Shivaiah | |
| 2017/0361461 A1* | 12/2017 | Tan | B25J 9/1661 |
| 2017/0361468 A1 | 12/2017 | Cheuvront et al. | |
| 2018/0043952 A1 | 2/2018 | Ellerman et al. | |
| 2018/0056520 A1 | 3/2018 | Ozaki | |
| 2018/0070776 A1 | 3/2018 | Ganninger | |
| 2018/0121994 A1 | 5/2018 | Matsunaga et al. | |
| 2018/0144244 A1 | 5/2018 | Masoud et al. | |
| 2018/0147718 A1 | 5/2018 | Oleynik | |
| 2018/0147723 A1 | 5/2018 | Vijayanarasimhan | |
| 2018/0150661 A1 | 5/2018 | Hall et al. | |
| 2018/0200014 A1 | 7/2018 | Bonny et al. | |
| 2018/0200885 A1* | 7/2018 | Ikeda | B25J 9/1653 |
| 2018/0202819 A1 | 7/2018 | Mital | |
| 2018/0214221 A1 | 8/2018 | Crawford et al. | |
| 2018/0257221 A1 | 9/2018 | Toothaker et al. | |
| 2018/0275632 A1 | 9/2018 | Zhang et al. | |
| 2018/0338504 A1 | 11/2018 | Lavri et al. | |
| 2018/0345479 A1 | 12/2018 | Martino et al. | |
| 2018/0348783 A1 | 12/2018 | Pitzer et al. | |
| 2018/0354140 A1 | 12/2018 | Watanabe | |
| 2019/0001489 A1 | 1/2019 | Hudson et al. | |
| 2019/0039241 A1 | 2/2019 | Langenfeld et al. | |
| 2019/0049970 A1 | 2/2019 | Djuric et al. | |
| 2019/0056751 A1 | 2/2019 | Ferguson et al. | |
| 2019/0066609 A1 | 2/2019 | Woo et al. | |
| 2019/0212441 A1 | 7/2019 | Casner et al. | |
| 2019/0291277 A1 | 9/2019 | Oleynik | |
| 2019/0310611 A1 | 10/2019 | Jain et al. | |
| 2019/0321989 A1 | 10/2019 | Anderson et al. | |
| 2019/0381617 A1 | 12/2019 | Patrini et al. | |
| 2020/0023520 A1 | 1/2020 | Yoshizumi | |
| 2020/0030966 A1 | 1/2020 | Hasegawa et al. | |
| 2020/0047349 A1 | 2/2020 | Sinnet et al. | |
| 2020/0070355 A1 | 3/2020 | Neumann et al. | |
| 2020/0073358 A1 | 3/2020 | Dedkov et al. | |
| 2020/0073367 A1 | 3/2020 | Nguyen et al. | |
| 2020/0086437 A1 | 3/2020 | Johnson | |
| 2020/0086485 A1 | 3/2020 | Johnson | |
| 2020/0086487 A1 | 3/2020 | Johnson | |
| 2020/0086497 A1 | 3/2020 | Johnson | |
| 2020/0086498 A1 | 3/2020 | Johnson | |
| 2020/0086502 A1 | 3/2020 | Johnson | |
| 2020/0086503 A1 | 3/2020 | Johnson | |
| 2020/0086509 A1 | 3/2020 | Johnson | |
| 2020/0087069 A1 | 3/2020 | Johnson | |
| 2020/0090099 A1 | 3/2020 | Johnson | |
| 2020/0298403 A1 | 9/2020 | Nilsson et al. | |
| 2022/0066456 A1 | 3/2022 | Ebrahimi et al. | |

FOREIGN PATENT DOCUMENTS

| | | |
|---|---|---|
| EP | 474881 A1 | 3/1992 |
| EP | 1145804 A1 | 10/2001 |
| EP | 2011610 A2 | 1/2019 |
| GB | 2550396 A | 11/2017 |
| JP | 2004-295620 A | 10/2004 |
| JP | 200849462 A | 3/2008 |
| JP | 2020-028957 A | 2/2020 |
| WO | 99/03653 A1 | 1/1999 |
| WO | 2005072917 A1 | 11/2005 |
| WO | 2007/122717 A1 | 11/2007 |
| WO | 2009045827 A2 | 4/2009 |
| WO | 20150117156 A | 8/2015 |
| WO | 20170197170 A1 | 11/2017 |
| WO | 20180133861 A1 | 7/2018 |
| WO | 21080133861 A1 | 7/2018 |
| WO | 2020056279 A1 | 3/2020 |
| WO | 2020056295 A1 | 3/2020 |
| WO | 2020056301 A1 | 3/2020 |
| WO | 2020056353 A1 | 3/2020 |
| WO | 2020056362 A1 | 3/2020 |
| WO | 2020056373 A1 | 3/2020 |
| WO | 2020056374 A1 | 3/2020 |
| WO | 2020056375 A1 | 3/2020 |
| WO | 2020056376 A1 | 3/2020 |
| WO | 2020056377 A1 | 3/2020 |
| WO | 2020056380 A1 | 3/2020 |

OTHER PUBLICATIONS

Blutinger, J., et al., "Scoop: Automating the Ice Cream Scooping Process", Introduction to Robotics MECE E4602, Group 8 Final Project, Dec. 2016.

Bollini, M., et al., "Interpreting and Executing Recipes with a Cooking Robot", Experimental Robotics, 2013.

Cao, Z., et al. "Realtime Multi-Person 2D Pose Estimation using Part Affinity Fields", Proceedings of the IEEE Conference on Computer Vision and Pattern Recognition. 2017.

Dantam, N.T., et al. "Incremental Task and Motion Planning A Constraint-Based Approach", Robotics: Science and Systems 12, 00052, 2016.

Ferrer-Mestres, J., et al., "Combined Task and Motion Planning As A Classical AI Planning" arXiv preprint arXiv:1706.06927, 2017—arxiv.org; Jun. 21, 2017.

Kaelbling, L.P, et al., "Integrated task and motion planning in beliefs space" The International Journal of Robotics Research; 0(0) 1-34; 2013.

Martinez, J., et al., "On human motion prediction using recurrent neural networks." Proceedings of the IEEE Conference on Computer Vision and Pattern Recognition. 2017.

Nedunuri, S., et al., "SMT-Based Synthesis of Integrated Task and Motion Plan from Plan Outlines"; the Proceedings of the 2014 IEEE Intl. Conf. on Robotics and Automation (ICRA2014).

Saxena, A., et al., "RoboBrain: Large-Scale Knowledge Engine for Robots", arXiv preprint arXiv:1412.0691 (2014).

Schenck, C., et al., "Learning Robotic Manipulation of Granular Media", 1st Conference on Robot Learning, arXiv:1709.02833, Oct. 25, 2017.

Shimizu, T. and Kubota, T., "Advanced Sampling Scheme Based on Environmental Stiffness for a Smart Manipulator", Robot Intelligence Technology and Applications, pp. 19-208. 2012.

Srivastava, S., et al. "Combined Task and Motion Planning Through an Extensible Planner-Independent Interface Layer"; 2014 IEEE international conference on robotics and automation (ICRA), 639-646.

(56) References Cited

OTHER PUBLICATIONS

Stentz, A., et al., "A Robotic Excavator for Autonomous Truck Loading", In Proceedings of the IEEE/RSJ International Conference on Intelligent Robotic Systems, 1998.
Villegas, et al, "Learning to Generate Long-term Future via Hierarchical Prediction", In Proceedings of the 34th International Conference on Machine Learning (ICML), 2017.
Walker, J., et al., "The pose knows: Video forecasting by generating pose futures", In The IEEE International Conference on Computer Vision (ICCV), Oct. 2017.
Watson, J,. Kevin, et al. "Use of Voice Recognition for Control of a Robotic Welding Workcell", IEEE Control Systems Magazine; p. 16-18; (ISSN 0272-1708); 7 , Jun. 1, 1987.
Wong, J.M., et al., "SegICP-DSR: Dense Semantic Scene Reconstruction and Registration", Draper, arXiv:1711.02216; Nov. 6, 2017.
Wong, J.M., et al., "SegICP: Integrated Deep Semantic Segmentation and Pose Estimation", Massachusetts Institute of Technology, 2017 IEEE/RSJ International Conference on Intelligent Robots and Systems (IROS); Sep. 5, 2017.
Wu, J., et al., "Real-Time Object Pose Estimation with Pose Interpreter Networks", IEEE/RSJ International Conference on Intelligent Robots and Systems (IROS), 2018.
Ye, G., et al., "Demonstration-Guided Motion Planning" Robotics Research. Springer Tracts in Advanced Robotics, vol. 100, 2017.
International Search Report and Written Opinion for PCT/US2019/051176 dated Dec. 12, 2019 entitled "Determining How To Assemble A Meal".
International Search Report and Written Opinion for PCT/US2019/051175 dated Jan. 3, 2020 entitled Stopping Robot Motion Based On Sound Cues.
Dexai Robotics: "Alfred Sous-Chef scooping ice-cream" Youtube, retrieved from Internet Jun. 8, 2018. https://www.youtube.com/watch?v=caNG4qrZhRU.
International Search Report and Written Opinion for PCT/US2019/051179 dated Jan. 9, 2020 entitled "An Adaptor for Food-Safe, Bin-Compatible, Washable, Tool-Changer Utensils".
International Search Report and Written Opinion for PCT/US2019/051148 dated Dec. 12, 2019 entitled "Food-Safe, Washable, Thermally-Conductive Robot Cover".
International Search Report and Written Opinion for PCT/US2019/051177 dated Jan. 9, 2020 entitled "Voice Modification To Robot Motion Plans".
International Search Report and Written Opinino for PCT/US2019/051183 dated Jan. 14, 2020 entitled "Locating And Attaching Interchangeable Tools In-Situ".
International Search Report and Written Opinion for PCT/US2019/051067 dated Jan. 16, 2020 entitled "Robot Interaction With Human Co-Workers".
International Search Report and Written Opinion for PCT/US2019/051161 dated Jan. 15, 2020 entitled "Food-Safe, Washable Interface For Exchanging Tools".
ATI Industrial Automation: Automatic/RoboticTool Changers, "Automatic/RoboticTool Changes", Tool Changer News. Downloaded from Internet Feb. 4, 2020. https://www.ati-ia.com/products/toolchanger/robot_tool_changer.aspx.
Dexai Robotics: "A Robot Company Is Born", retrieved from Internet from Feb. 5, 2020. https://draper.com/dexai-robotics.
Draper—"A 'Preceptive Robot' Earns Draper Spots as KUKA Innovation Award Finalist" Aug. 30, 2017, retrieved from Internet from Feb. 5, 2020. https://www.draper.com/news-releases/perceptive-robot-earns-draper-spot-kuka-innovation-award-finalist.
"Draper Spins Out Dexai Robotics", Mar. 21, 2019, retrieved from Internet from Feb. 5, 2020. https://www.draper.com/news-releases/draper-spins-out-dexai-robotics.
Dynamic Robotic Manipulation—KUKA Innovation—Finalist Spotlight—Apr. 26, 2018 retrieved from Internet Feb. 5, 2020. https://youtube.com/watch?v=7wGc-4uqOKw.
Siciliano, B., et al. "Chapter 8—Motion Control—Robotics Modelling Planning and Control", In: Robotics Modelling Planning and Control, Dec. 23, 2009.
Siciliano, B., et al. "Chapter 9—Force Control—Robotics Modelling Planning and Control", In: Robotics Modelling Planning and Control, Dec. 23, 2009.
International Search Report and Written Opinion for PCT/US2019/051040 dated Feb. 7, 2020 entitled "Manipulating Fracturable And Deformable Materials Using Articulated Manipulators".
International Search Report and Written Opinion for PCT/US2019/051180 dated Jan. 31, 2020 entitled "One-Click Robot Order".
International Search Report and Written Opinion for PCT/US2019/051061 dated Apr. 3, 2020 titled "Controlling Robot Torque And Velocity Based On Context".
Olin College of Engineering, "Autonomous Tool Changer" Draper 2016-2017, retrieved from Internet Feb. 5, 2020. http://www.olin.edu/sites/default/files/draperarchival2.pdf.
Olin College of Engineering, Autonomous Tool Changer, MoMap and the Future, "How Can We Enable a Robotic Arm to Change and Use Human Tools Autonomously". Date unknown.
Feddema, John T., et al., Model-Based Visual Feedback Control for a Hand-Eye Coordinated Robotic System, Aug. 1992, IEEE, vol. 25, Issue: 8, pp. 21-31 (Year: 1992).
Yang, Shichao, et al., "Obstacle Avoidance through Deep Networks based Intermediate Perception", Apr. 27, 2017, The Robotics Instiute, Carnegie Mellon University (Year 2017).
Charabaruk, Nicholas; "Development of an Autonomous Omnidirectional Hazardous Material Handling Robot"; . University of Ontario Institute of Technology (Canada). ProQuest Dissertations Publishing, 2015. 10006730. (Year: 2015).
Langsfeld, Joshua D..; "Learning Task Models for Robotic Manipulation of Nonrigid Objects"; University of Maryland, College Park. ProQuest Dissertations Publishing, 2017. 10255938. (Year: 2017).
Rennekamp, T., et al., "Distributed Sensing and Prediction of Obstacle Motions for Mobile Robot Motion Planning," 2006, IEEE, International Conference on Intelligent Robots and Systems, pp. 4833-4838 (Year: 2006).

\* cited by examiner

CONTROLLING ROBOT TORQUE AND VELOCITY BASED ON CONTEXT

RELATED APPLICATION

This application claims the benefit of U.S. Provisional Application No. 62/730,934, filed on Sep. 13, 2018, U.S. Provisional Application No. 62/730,703, filed on Sep. 13, 2018, U.S. Provisional Application No. 62/730,947, filed on Sep. 13, 2018, U.S. Provisional Application No. 62/730,933, filed on Sep. 13, 2018, U.S. Provisional Application No. 62/730,918, filed on Sep. 13, 2018 and U.S. Provisional Application No. 62/731,398, filed on Sep. 14, 2018.

This application is related to U.S. patent application Ser. Nos. 16/570,100, 16/570,855, 16/570,955, 16/571,003, 16/570,915, 16/570,976, 16/571,025, 16/570,606, 16/571,040, and 16/571,041, all filed on the same day, Sep. 13, 2019.

The entire teachings of the above applications are incorporated herein by reference.

BACKGROUND

Traditionally, the food industry employs human labor to manipulate ingredients with the purpose of either assembling a meal such as a salad or a bowl, or packing a box of ingredients such as those used in grocery shopping, or preparing the raw ingredients. Robots have not yet been able to assemble complete meals from prepared ingredients in a food-service setting such as a restaurant, largely because the ingredients are arranged unpredictably and change shape in difficult-to-predict ways rendering traditional methods to move material ineffective without extensive modifications to existing kitchens. Additionally, traditional material handling methods are ill-suited to moving cooked foods without altering their texture and taste-profile. These difficulties arise because the friction, stiction, and viscosity of commonly consumed foods cause auger, conveyor, and suction mechanisms to become clogged and soiled, while these mechanisms simultaneously impart forces on the foodstuffs which alter their texture, consistency, and taste-profile in unappetizing ways.

SUMMARY

A key reason robots have been unable to assemble meals in the quick service food restaurant setting is the inability of robots to operate in close proximity with humans while utilizing appropriate torques for the task and environment in which the robots are operating. For instance, scooping ice cream from a container may require substantial force and torque at the contact point of the disher with the ice cream. If a human were to have a hand caught between the utensil and the material, these forces and torques would cause substantial injury. Therefore, the robot should only be allowed to apply high torques when the context of the action is appropriate to do so. Additionally, by determining when an action is dangerous due to the forces and torques required, this information can be used to guide the response of the robot to other signals such as recognizing the presence of a human in the workspace, as described in U.S. Patent Application titled "Robot Interaction With Human Co-Workers", Ser. No. 16/570,606, and sounds which might indicate that an accident has occurred, as described in U.S. Patent Application titled "Stopping Robot Motion Based On Sound Cues", Ser. No. 16/571,025. This same problem, inability to utilize appropriate torque for the task and environment, occurs in numerous fields and environments beyond quick service food restaurants, including product manufacturing and assembly environments, amongst other examples. Embodiments solve these problems and provide functionality for determining context specific torques for robots.

It is noted that while embodiments are described herein as functioning in a restaurant food assembly setting, embodiments are not so limited. Functionality described herein can be employed in any variety of environments in which robot control is desired.

An example embodiment first identifies a force and torque for a robot to accomplish a task. Next, context of a portion of a movement plan indicating motion of the robot to perform the task is identified. To continue, based on the identified force, torque, and context, a context specific torque is determined for at least one aspect of the robot while the robot executes the portion of the movement plan. In turn, the embodiment generates a control signal for the at least one aspect of the robot to operate in accordance with the determined context specific torque.

Another embodiment further comprises controlling, based on the control signal, the at least one aspect of the robot to operate by limiting the at least one aspect of the robot to the determined context specific torque. In this way, the robot's torque does not exceed the context specific torque for the portion of the movement plan. In an embodiment, determining the context specific torque includes loading the context specific torque from a model of the robot, the task, and an environment in which the robot is operating to perform the task.

In embodiments, "context" may include any conditions related in any way to the robot. For example, context may include any data related to the robot, the task performed by the robot, the motion of the robot, and the environment in which the robot is operating, amongst other examples. According to an example embodiment, context is at least one of: (a) free space, (b) active contact, (c) collision, (d) anticipated collision, (e) a likelihood of accident during the portion of the movement plan based on standards for (1) speed and separation limits and (2) allowable harm, (f) the task performed by the robot, e.g., slicing, scooping, grasping, picking, or machining material, (g) a set of possible colliding objects, where each object has an object class, and the object class indicates a severity of a collision with the object, (h) a probability distribution of possible colliding objects, (i) a probability distribution of one or more possible world configurations, (j) a continuous distribution of world configurations, and (k) a continuous distribution of objects. According to an embodiment, at least one of the probability distribution of possible colliding objects, the probability distribution of one or more possible world configurations, the continuous distribution of world configurations, and the continuous distribution of objects indicates probability of contact between the robot and objects during the portion of the movement plan.

Embodiments may utilize a variety of different techniques to identify the context of the portion of the movement plan. In an embodiment, the context is identified by determining a likelihood of accident during the portion of the movement plan based on standards for (i) speed and separation limits and (ii) allowable harm. Another embodiment identifies the context by identifying expected resistance encountered by the robot during the portion of the movement plan using a model of an environment of the robot. Yet another embodiment identifies context by processing context data using a neural network trained to determine if contact occurs during the portion of the movement plan. In such an embodiment, the neural network is trained on labeled context data that is labeled to indicate if contact occurs under conditions of the labelled context data. According to another embodiment, identifying the context includes identifying physical objects in an environment of the robot to determine proximity of the robot to the physical objects during the portion of the movement plan. Further, embodiments may determine the context by analyzing a computer based model of an environment of the robot to determine proximity of the robot to physical objects during the portion of the movement plan. Yet another embodiment identifies the context by performing a computer-based simulation of an environment including the robot using (i) the movement plan, (ii) a computer-based model of the environment, and (iii) a computer-based model of the robot. The results of the simulation provide a prediction of motion of the robot during the portion of the movement plan. Embodiments may also identify the context by processing data related to at least one of: the robot, the task, the movement plan, and an environment of the robot using a neural network. Such a neural network is trained to determine the context of the portion of the movement plan given the data related to at least one of the robot, the task, the movement plan and the environment of the robot.

Another embodiment determines the context by identifying a tool or a tool category being used by the robot during the portion of the movement plan. In one such example embodiment, the identified tool or tool category indicates a specific operating torque and, in determining the context specific torque, the specific operating torque is determined to be the context specific torque.

Embodiments may also determine other context specific controls for the robot, including, velocity, acceleration, position, and jerk limits. One such example embodiment further comprises, based on the identified context, determining a context specific velocity and a context specific position limit for the at least one aspect of the robot while the robot executes the portion of the movement plan. According to one such embodiment, the context specific torque, the context specific jerk, the context specific acceleration, the context specific velocity, and the context specific position limit are computed by choosing values, i.e., limits, which, based on a probability distribution, have a probability of safe operation in accordance with a specified standard.

Embodiments may utilize a variety of techniques, alone, or in combination, to determine the context specific torque, the context specific jerk, context specific acceleration, context specific velocity, and the context specific position limit. An embodiment uses a monte carlo analysis that determines a stopping distance of the robot, a maximum allowed velocity of the robot, and a maximum allowed torque of the robot by simulating one or more of: (i) object collisions, (ii) object detection rates, (iii) communication failures, and (iv) camera failures. In such an embodiment, the context specific torque, the context specific jerk, the context specific acceleration, the context specific velocity, and the context specific position limit are based on the determined stopping distance, maximum allowed velocity, and maximum allowed torque. Another embodiment implements a non-linear trajectory optimization using a collision probability and severity distribution as a cost function to directly compute a trajectory of the robot during the portion of the movement plan which minimizes collision costs. In such an embodiment, the context specific torque, the context specific velocity, and the context specific position limit are based on the computed trajectory. According to an embodiment, the collision probability and severity distribution are generated from a simulation of possible ingressing objects, or from direct measurements of objects interacting with the robot. The results of the simulation or the measurements are used to create a set of possible objects, or a function is fit to the results of the simulation or the measurements to generate the collision probability and severity distribution.

In another embodiment, feed-forward torque is used to generate motion of the robot. Such an embodiment may further include using a low-gain feedback controller implementing the feed-forward torque to control tracking of the at least one aspect of the robot against a reference trajectory that is in accordance with at least one of the context specific position limit, the context specific velocity, acceleration, and the context specific torque. According to yet another embodiment, the context specific torque, the context specific velocity, and the context specific position are determined in accordance with velocity and torque limits required by a safety analysis and the feedback controller is designed based on tracking a desired trajectory of the robot and meeting the context specific torque, the context specific velocity, and the context specific position limit.

Yet another embodiment identifies the context of the portion of the movement plan by detecting, with at least one sensor, at least one obstacle in an environment of the robot. In such an embodiment, at least one of the context specific torque, the context specific jerk, context specific acceleration, the context specific velocity, and the context specific position limit are determined to avoid collision between the robot and the detected obstacle. According to another embodiment, identifying the context includes continuously computing a current stopping distance of the robot to evaluate an instantaneous torque limit, velocity limit, and acceleration limit based on appearance of previously unknown obstacles in an environment including the robot. In such an embodiment, the identified context includes the computed current stopping distance.

Another embodiment employs a feed-forward torque controller to generate motion of the robot. Such an embodiment uses a collision severity and probability density function as a cost function for the feed-forward torque controller to determine a trajectory of the robot which has a low probability of causing a collision, given a modeled likelihood of unknown objects appearing in a workspace of the robot.

As described herein, embodiments control at least one aspect of the robot. In embodiments, this "aspect" may be any aspect of the robot, such as a joint, a hydraulic system, an electric actuator, an air driven actuator, or an end effector tool, amongst other examples.

Another embodiment is directed to a system that includes a processor and a memory with computer code instructions stored thereon. In such an embodiment, the processor and the memory, with the computer code instructions, are configured to cause the system to implement any embodiments described herein.

Yet another embodiment is directed to a computer program product. The computer program product comprises a computer-readable medium with computer code instructions stored thereon where, the computer code instructions, when executed by a processor, cause an apparatus associated with the processor to perform any embodiments described herein.

In an embodiment, the method includes determining a context of a portion of a movement plan of a robot and determining an appropriate setting, e.g., velocity, acceleration, torque, and position, of an aspect of a robot. Certain contexts, such as moving in close proximity to obstacles where collision is likely because the obstacles have uncertain locations, movements, or accelerations, or maneuvering a dangerous end-effector close to a human co-worker, require limiting the robot operation, e.g., torque, to prevent injury. However, limits can be much higher when the robot is moving in contact with a stiff material, such as scooping frozen ice-cream, as long as no humans/obstacles are in harm's way of the robot exerting high torque. Embodiments can provide control to ensure safe operation under these robot operating conditions.

An impedance controller is capable of directing a robot to apply a specific force/torque at an end effector. It is also possible to generalize the impedance controller to control the force applied by any position of the robot that is in contact with another object, as long as the force/torque vector is within the control space of the robot. An embodiment uses an impedance controller to apply the force/torque which is specified by the robot motion plan and allowed by the context of the robot motion.

It is possible to control robot motor torque via feedback control, feed-forward control, or a combination of the two. According to an embodiment, in all cases of control (feedback and feed-forward), the amount of applied torque is limited by the physical constraints of the robot and safety considerations. There is a minimum torque required to move the robot along a given trajectory, and for each time-constrained robot motion, there also exists a minimum torque trajectory. In an embodiment, by computing the necessary feed-forward torque, the robot torque limit can be set to a value just above the minimum torque required. Therefore, the robot can meet safety standards while still continuing to operate to perform a task.

In an embodiment, in order to compute the feed-forward torque for a given action, it is necessary to model the expected resistance to be encountered during the motion. In an embodiment, the expected resistance is based on a model of an environment of the robot arm. In an embodiment, the context specific torque is loaded from a model of the robot arm (including moments of inertia, gravity, friction, stiction, motor performance, and controller response), the environment (viscosity, density, fluid-based drag), and intended contacts with objects and materials. In another embodiment, the context also includes distance from potential obstacles and likelihood of interaction with human co-workers. In regions where collision is unlikely, robot operations, e.g., torque and velocity constraints, can be relaxed to enable improved processing speed. By automatically determining these regions aka 'the context', embodiments can enable safe operation without tedious human, i.e., manual, design.

In an embodiment, identifying context of a portion of a movement plan includes determining likelihood of collision between the robot and an obstacle during the portion of the movement plan. According to one such embodiment, the likelihood of collision is determined by a probability distribution of the current location of objects in the environment or anticipated to be in the environment. This probability distribution can be represented as gaussian errors on the object pose (i.e., location in space), as output by a Bayesian filter (e.g., a Kalman Filter or its variants) or a probability density where colliding trajectories are scored based on the probability density of the objects with which they might collide. Potential obstacles in the environment may also be represented as a belief-space, e.g. a distribution or discrete set of possible states.

BRIEF DESCRIPTION OF THE DRAWINGS

The foregoing will be apparent from the following more particular description of example embodiments, as illustrated in the accompanying drawings in which like reference characters refer to the same parts throughout the different views. The drawings are not necessarily to scale, emphasis instead being placed upon illustrating embodiments.

DETAILED DESCRIPTION

A description of example embodiments follows.

As described herein, embodiments provide functionality for controlling robots based upon the context of the robot. Such functionality can be employed in any variety of environments in which robot control is desired, such as a quick service restaurant.

Operating a robot in a food preparation environment, such as a quick service restaurant, can be challenging for several reasons. First, the end effectors (e.g., utensils), that the robot uses need to remain clean from contamination. Contamination can include allergens (e.g., peanuts), dietary preferences (e.g., contamination from pork for a vegetarian or kosher customer), dirt/bacteria/viruses, or other non-ingestible materials (e.g., oil, plastic, or particles from the robot itself). Second, the robot should be operated within its design specifications, and not exposed to excessive temperatures or incompatible liquids, without sacrificing cleanliness. Third, the robot should be able to manipulate food stuffs, which are often fracturable and deformable materials, and further the robot must be able to measure an amount of material controlled by its utensil in order to dispense specific portions. Fourth, the robot should be able to automatically and seamlessly switch utensils (e.g., switch between a ladle and salad tongs). Fifth, the utensils should be adapted to be left in an assigned food container and interchanged with the robot as needed, in situ. Sixth, the interchangeable parts (e.g., utensils) should be washable and dishwasher safe. Seventh, the robot should be able to autonomously generate a task plan and motion plan(s) to assemble all ingredients in a recipe, and execute that plan. Eighth, the robot should be able to modify or stop a motion plan based on detected interference or voice commands to stop or modify the robot's plan. Ninth, the robot should be able to minimize the applied torque based on safety requirements or the task context or the task parameters (e.g., density and viscosity) of the material to be gathered. Tenth, the system should be able to receive an electronic order from a user, assemble the meal for the user, and place the meal for the user in a designated area for pickup automatically with minimal human involvement.

Figure 1:
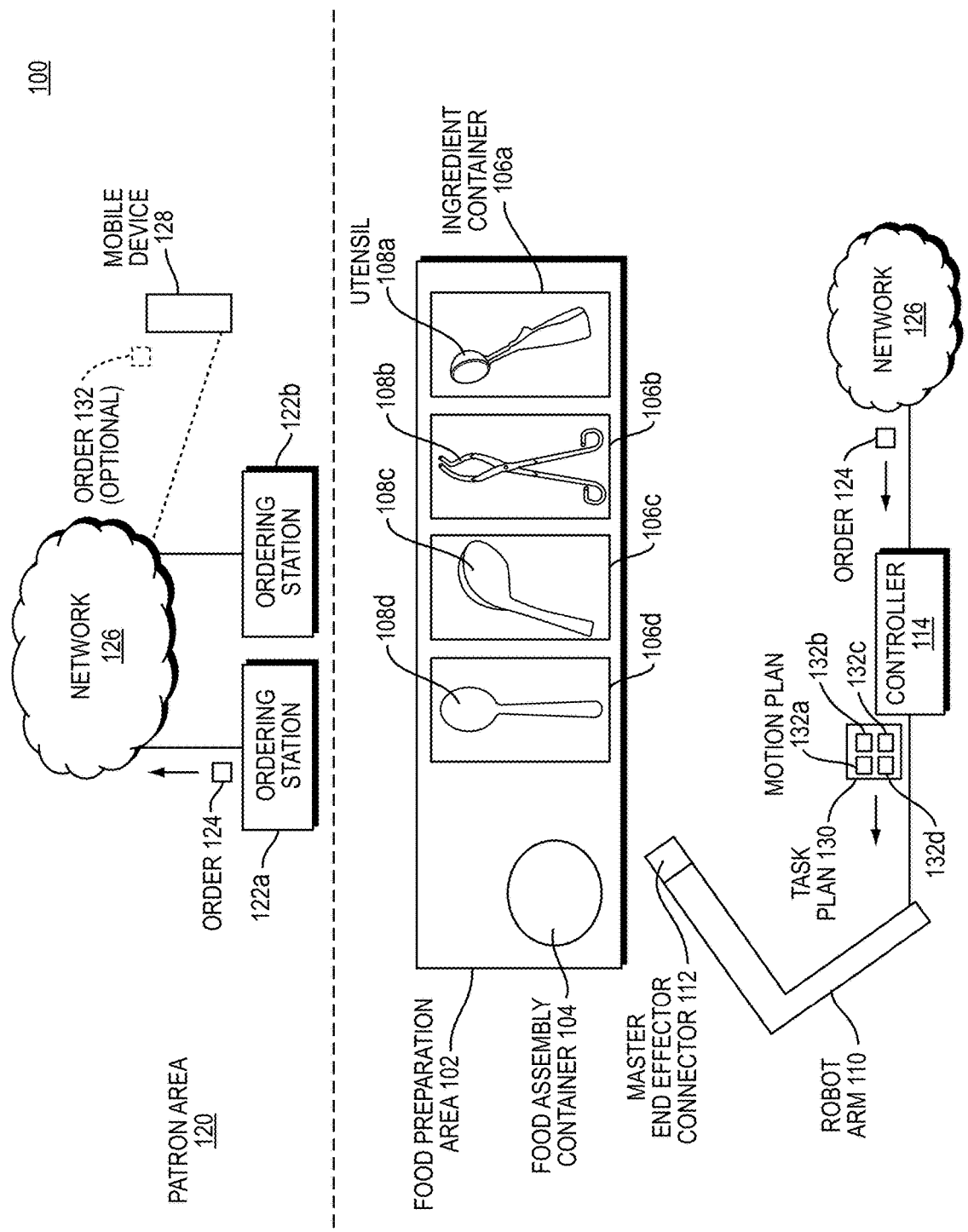
FIG. 1 is a block diagram illustrating an example embodiment of a quick service food environment of embodiments of the present disclosure.

FIG. 1 is a block diagram illustrating an example embodiment of a quick service food environment 100 of embodiments of the present disclosure. The quick service food environment 100 includes a food preparation area 102 and a patron area 120.

The food preparation area 102 includes a plurality of ingredient containers 106a-d each having a particular foodstuff (e.g., lettuce, chicken, cheese, tortilla chips, guacamole, beans, rice, various sauces or dressings, etc.). Each ingredient container 106a-d stores in situ its corresponding ingredients. Utensils 108a-d may be stored in situ in the ingredient containers or in a stand-alone tool rack not shown). The utensils 108a-d can be spoons, ladles, tongs, dishers (scoopers), spatulas, or other utensils. Each utensil 108a-d is configured to mate with and disconnect from a tool changer interface 112 of a robot arm 110. While the term utensil is used throughout this application, a person having ordinary skill in the art can recognize that the principles described in relation to utensils can apply in general to end effectors in other contexts (e.g., end effectors for moving fracturable or deformable materials in construction with an excavator or backhoe, etc.); and a robot arm can be replaced with any computer controlled actuatable system which can interact with its environment to manipulate a deformable material. The robot arm 110 includes sensor elements/modules such as stereo vision systems (SVS), 3D vision sensors (e.g., Microsoft Kinect™ or an Intel RealSense™), LIDAR sensors, audio sensors (e.g., microphones), inertial sensors (e.g., internal motion unit (IMU), torque sensor, weight sensor, etc.) for sensing aspects of the environment, including pose (i.e., X, Y, Z coordinates and roll, pitch, and yaw angles) of tools for the robot to mate, shape and volume of foodstuffs in ingredient containers, shape and volume of foodstuffs deposited into food assembly container, moving or static obstacles in the environment, etc.

To initiate an order, a patron in the patron area 120 enters an order 124 in an ordering station 122a-b, which is forwarded to a network 126. Alternatively, a patron on a mobile device 128 can, within or outside of the patron area 120, generate an optional order 132. Regardless of the source of the order, the network 126 forwards the order to a controller 114 of the robot arm 110. The controller generates a task plan 130 for the robot arm 110 to execute.

The task plan 130 includes a list of motion plans 132a-d for the robot arm 110 to execute. Each motion plan 132a-d is a plan for the robot arm 110 to engage with a respective utensil 108a-d, gather ingredients from the respective ingredient container 106a-d, and empty the utensil 108a-d in an appropriate location of a food assembly container 104 for the patron, which can be a plate, bowl, or other container. The robot arm 110 then returns the utensil 108a-d to its respective ingredient container 106a-d, a tool rack (not shown), or other location as determined by the task plan 130 or motion plan 132a-d, and releases the utensil 108a-d. The robot arm executes each motion plan 132a-d in a specified order, causing the food to be assembled within the food assembly container 104 in a planned and aesthetic manner.

Within the above environment, various of the above described problems can be solved. The environment 100 illustrated by FIG. 1 can improve food service to patrons by assembling meals faster, more accurately, and more sanitarily than a human can assemble a meal. Some of the problems described above can be solved in accordance with the disclosure below.

For instance, in the environment 100, it may be necessary for a human to be in close proximity with the robot arm 110. Embodiments of the present disclosure can be employed to limit robot functionality, e.g., torque, force, velocity, acceleration, and position based upon the context of the robot arm, e.g., when the robot is in close proximity to a human.

A robot may have several distinct modes of operation that each can employ different levels of torque. Such a robot would be improved from an approach to limit torque based on the current mode of the robot. As an example, a robot that scoops ice cream with a mechanical arm and a disher exerts high torque when the context is the actual scooping process (e.g., active contact with material) and needs significantly lower torque when the context is moving through free space. Setting a generic torque limit (e.g., maximum allowed torque) for one or more aspects of the robot (e.g., joints of the robot, the robot arm, or other mechanical components of the robot) is a standard safety feature, but these generic torque limits are static and do not change during operation of the robot. Embodiments improve on existing robots by providing context specific robot control. Further, embodiments can be used to stop a robot's motion when a context specific torque limit is exceeded.

Embodiments can operate in real-time by considering potential collisions with obstacles, the dynamic environment of the robot (e.g. contact vs. none, material through which motion is being executed), and potential hazardous scenarios, e.g., scenarios that are dangerous to humans, are considered. Additionally, possible interruptions of the robot motion, including unexpected entry of obstacles or human co-workers into the space are also represented in a monte-carlo simulation, as described herein, as low probability, but high consequence parts of the obstacle distribution. In embodiments, potential trajectories can be scored by their distance to collision with obstacles, by likelihood of event, and/or reaction time of a sensor system to detect the obstacle. Such embodiments thus determine reaction time of the robot to alter its plan (which allows for local velocity limits to allow for changing direction) and potential severity of the event. For example, a high velocity trajectory of a sharp utensil at head height is strongly discouraged (e.g., via a negative weighting of a trajectory with high velocity/ torque, etc.) because of the potential for a human to enter the work zone and little available reaction time to avoid a potentially injurious contact.

Torque limits are a crucial safety feature of robots which operate in close proximity to people because torque limits prevent the robot from exerting pressures above safe values. The ISO standard, e.g., ISO/TS 15066 on Robots and Robotic Devices—Collaborative Robots (hereinafter "The ISO Standard") describes safety standards on pressure applied by robots near humans. These safe pressure limits are based on the affected body part, the surface area of the tool/robot appendage (e.g., robot arm), the applied torque, and the momentum of the robot, when the robot or a part of the robot contacts a person.

Often tasks require tools having small surface areas (e.g., cutting utensils) and high torques. Current torque limiting technology prevents robots from performing these tasks while people are working in the vicinity of the robot (e.g., able to accidentally come in contact with the robot). Rather than simply providing a solution where a robot cannot perform a task in the vicinity of an obstacle, e.g., human, embodiments allow the robot's functionality, e.g., torque and velocity, to be dynamically adjusted based on the context of the robot. This functionality increases system safety by limiting the region where a robot can apply a torque that causes pressure above the ISO standard if a person contacts the robot.

Consider an ice cream scooping example where a robot uses a tool with a small surface area (e.g., disher) and a high torque task (e.g., the disher cutting through frozen ice cream) where high torque is needed to complete the task. Using standard tools to limit torque sets the torque limit to the maximum value expected during this task. In current systems, if the robot collides with an obstacle while moving through free space, the robot does not stop applying force until this large, and potentially unsafe, torque limit is reached, causing potential harm to the robot or the colliding object. In contrast, embodiments determine context specific torque limits to solve this problem. With a context specific torque limit, the context specific torque limit for traversing free space can be considerably lower than the context specific torque limit for the scooping process. Any accidental collision while the robot traverses free space, and therefore, is using the lower torque limit for that activity, is less destructive because the robot stops before exceeding the maximum safe pressure for that activity according to the ISO Standard (ISO/TS 15066). The context specific torque limit allows the robot to safely perform tasks in close proximity with people if the region where high torque is applied is inaccessible by the collaborative workers/human co-workers.

In another example of context specific torque limits, when the robot operates with a known model of its environment and obstacles therein, it can limit the torque and velocity of the robot based on distance to known obstacles, which allows for safer operation.

Embodiments provide functionality to control robot operation, e.g., torque and velocity, amongst other examples, based on context. The context can include current location of the robot, distance to collision, current velocity, and position in a motion plan (e.g., a plan that indicates the robot's location and path for movements through free space and the robot's contact with material, amongst other examples.

Figure 2:
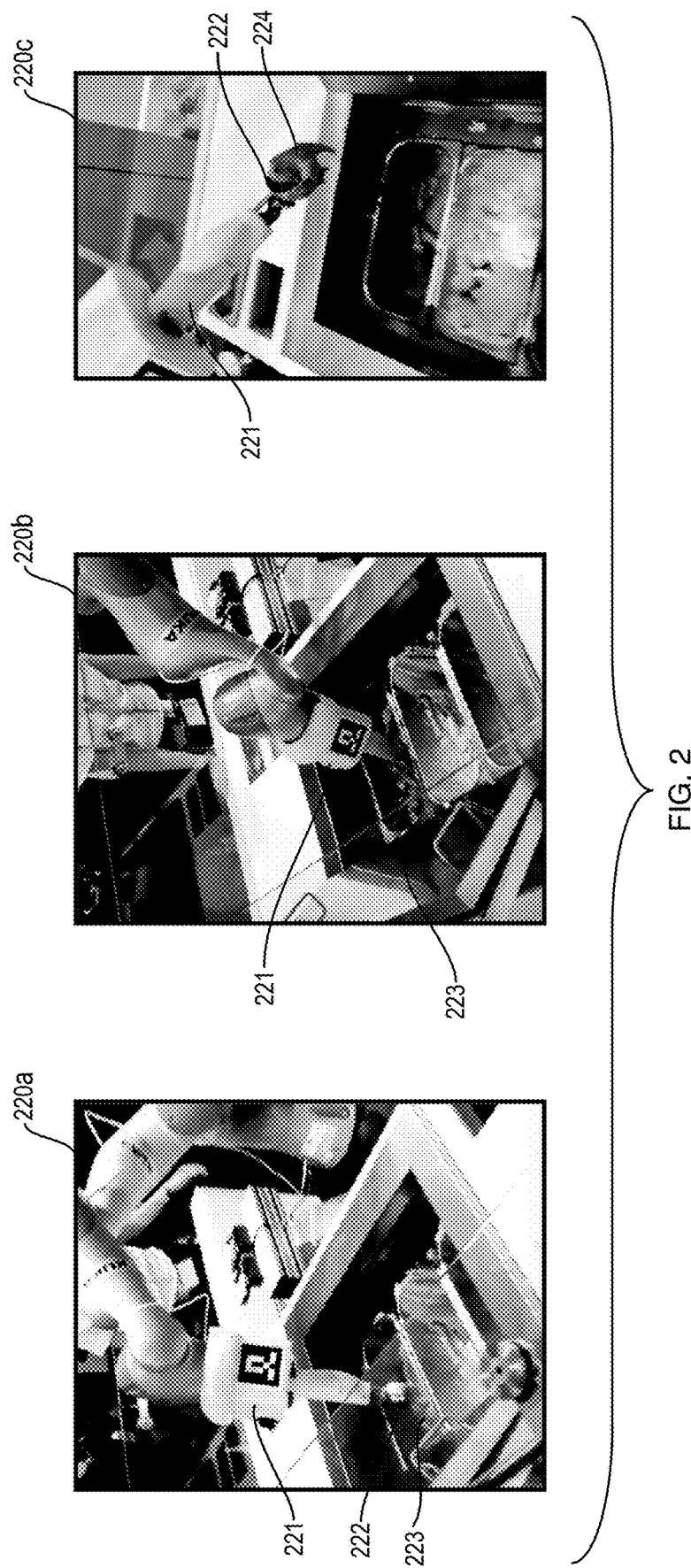
FIG. 2 are images illustrating example applications of embodiments.

FIG. 2 shows images 220a-c illustrating example applications of embodiments. Using embodiments, torque for the robot arm 221 can be controlled. In the image 220a, the robot arm 221 with a scooping end-effector 222 is approaching the bin 223 to scoop ice cream. Using an embodiment, the force and torque to scoop ice cream is determined and the context of a portion of a movement plan to perform the ice cream scooping task is determined. In the example of the image 220a of FIG. 2, the robot arm 221 with the scooping end-effector 222 is approaching the bin 223 and, in such an example, the context for this "approaching" portion of the movement plan is determined to be operation in free space. Based on the identified torque and force to accomplish the task and the identified context, free space, a context specific torque for the robot arm 221 for the approaching portion is determined. As such, in the image 220a, a low torque limit is applied while the robot arm 221 is in free space (e.g., before reaching the ice cream to be scooped).

In the picture 220b, the robot arm 221 is actively scooping ice cream from the bin 223. Like the example described above in relation to the image 220a, embodiments can be used to determine the context specific torque for the active scooping portion of the robot's movement plan. Using such methods, a high context specific torque is determined for the robot arm 221 while the robot arm 221 is actively scooping the ice cream as depicted in the image 220b. As such, the robot arm 221 can be controlled to apply the high context specific torque while the robot arm 221 scoops the ice cream.

In the picture 220c, the robot arm 221 with the scooping end effector 222 holding ice cream 224 is moving in free space. Again, using embodiments, the context of the robot for this portion of the movement plan is determined to be moving in free space holding the ice cream 224. As such, a low context specific torque that allows for moving the robot arm 221 with the end effector 222 holding the ice cream 224 is determined. Then, the robot arm 221 can be controlled to apply a low torque while the end effector 222 holding the ice cream 224 is in free space.

Figure 3:
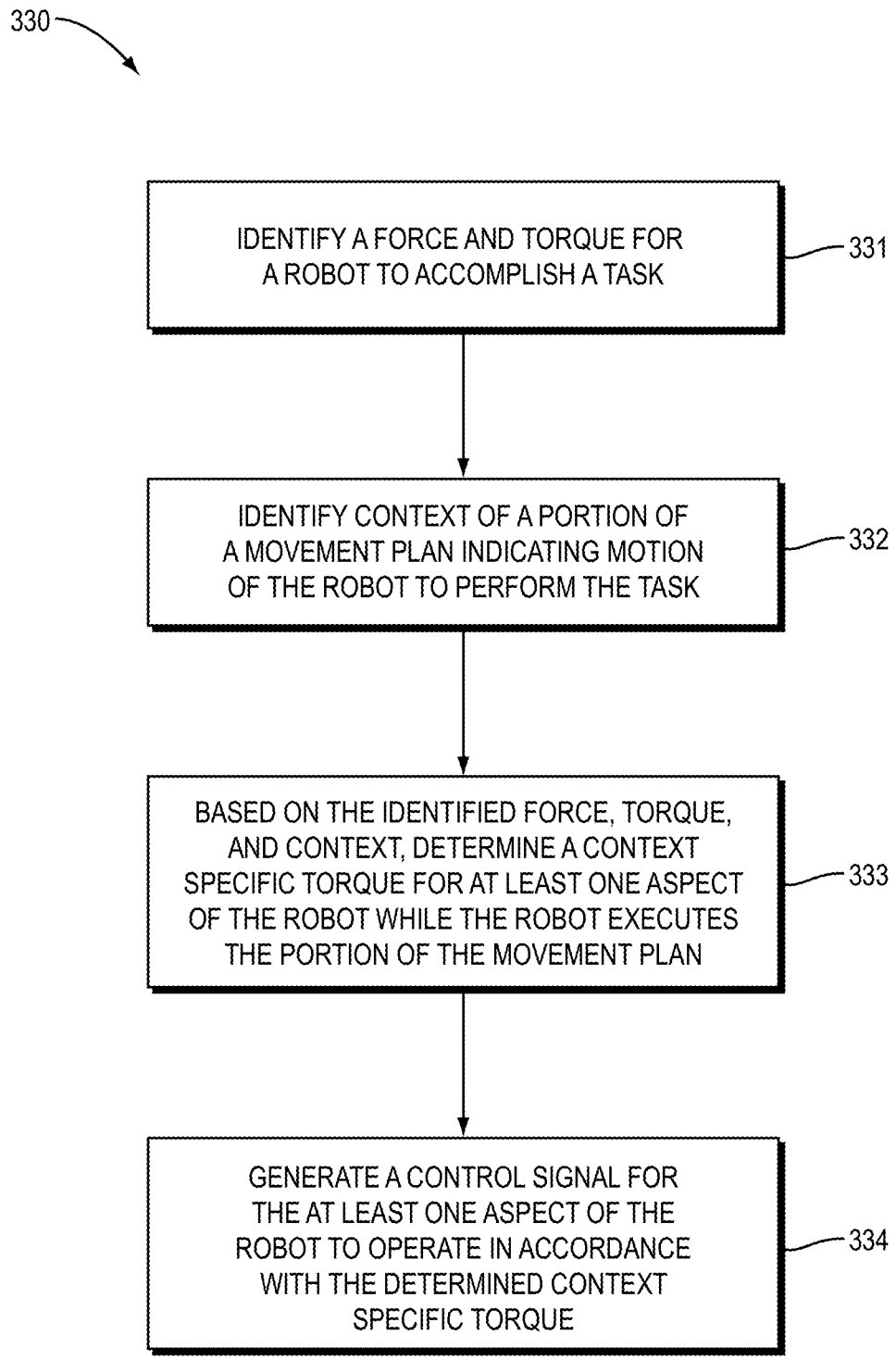
FIG. 3 is a flowchart of a method embodiment of the present disclosure.

FIG. 3 is a flow chart of a method 330 for robot control according to an embodiment. The method 330 is computer, i.e., processor, implemented and may be performed via any combination of hardware and software as is known in the art. For example, the method 330 may be implemented via one or more processors with associated memory storing computer code instructions that cause the one or more processors to implement steps 331, 332, 333, and 334 of the method 330.

The method 330, at 331, identifies a force and torque for a robot to accomplish a task. According to an embodiment, at 331, the minimum force and torque needed to accomplish a task are determined. In an embodiment, the minimum force and torque are determined through either a physical model of the material and task which predicts the required robot joint torques or by performing the task with the robot and recording the required torque. The identified force and torque to accomplish the task can also be a sliding scale that is a function of how quickly the task needs to be accomplished. Further, in the embodiments, the "task" can be the task performed during the portion of the movement plan for which context specific torque is being determined.

To illustrate, returning to the ice cream scooping example described above in relation to FIG. 2, the maximum force and torque needed to scoop ice cream is detected at step 331. In an embodiment force and torque are vector quantities at a utensil, i.e., end effector, the force and torque are translated to scalar quantities (joint torques) for the robot due to its specific geometry. In such an embodiment, two robots with different geometries scooping ice cream will have the same force are torque at the utensil and different joint torques to accomplish the same task. In an embodiment, the force and torque determined at 331 are the force and torque for an end effector of the robot to accomplish a task. In other words, a tool force and tool torque may be determined at 331. For example, the force that needs to be exerted by the ice cream scoop to scoop ice cream. In an embodiment, pressure that needs to be exerted to accomplish the task is also determined. This pressure may be determined from the force.

Next, at 332, context of a portion of a movement plan indicating motion of the robot to perform the task is identified. Context may include any information related to the operation of the robot, such as, the likelihood of injury for the portion of the movement plan. To illustrate, returning to the ice cream scooping example of FIG. 2, in the example depicted in the image 220a, it is determined that the context of the portion of the movement plan in the image 220a is movement in free space.

To continue, at 333, based on the identified force, torque, and context, a context specific torque is determined for at least one aspect of the robot while the robot executes the portion of the movement plan. The context specific torque determined at 333 can also be based upon pressure that needs to be exerted by the robot to accomplish the task. To illustrate, in the ice cream scooping example in the image 220a, a low context specific torque is determined because the robot is approaching the bin to scoop ice cream and, thus, only a force and torque needed to move the robot toward the bin is needed rather than the force and torque needed to scoop the ice cream. The context specific torque determined at 333 may be considered a joint torque, i.e., torque that is provided by a joint of the robot. The joint torque can be contrasted with the torque determined at 331, which may be an end effector torque.

Further, it is noted that embodiments are not limited to determine a single context specific torque. Instead, embodiments may determine a context specific torque for multiple aspects of the robot, e.g., each joint of the robot. In this way, a context specific torque can be determined for each joint of the robot so that the robot can accomplish the task, i.e., exert the torque and force needed to accomplish the task.

Returning to FIG. 3, to continue, a control signal is generated 334 for the at least one aspect of the robot to operate in accordance with the determined context specific torque. The control signal may take any form capable of controlling torque of the robot. In an embodiment, the control signal may command the position of the robot joints as a function of time with a maximum allowed torque to be used by a controller which moves the joints to their desired positions.

Another embodiment of the method 330 goes further and includes controlling the at least one aspect of the robot based on the control signal (determined at 334) to operate in accordance with the determined context specific torque. This may include limiting the at least one aspect of the robot to the determined context specific torque. In such an embodiment of the method 330, the robot's torque does not exceed the context specific torque for the portion of the movement plan.

In an embodiment, determining the context specific torque at 333 includes loading the context specific torque from a model of the robot, the task, and an environment in which the robot is operating to perform the task. In such an embodiment, the task is selected from a library of tasks, where the required torque is recorded. The model of the robot determines if the required torque can be achieved and if, given the environment, the robot is physically able to perform the task.

In embodiments, of the method 330 "context" may include any conditions related in any way to the robot. For example, context may include any data related to the robot, the task performed by robot, the motion of the robot, and the environment in which the robot is operating, amongst other examples. According to an example embodiment of the method 330, context is at least one of: (a) free space, (b) active contact, (c) collision, (d) anticipated collision, (e) a likelihood of accident during the portion of the movement plan based on standards for (1) speed and separation limits and (2) allowable harm, (f) the task performed by the robot, e.g., slicing, scooping, grasping, picking, or machining material, (g) a set of possible colliding objects, where each object has an object class, and the object class indicates a severity of a collision with the object, (h) a probability distribution of possible colliding objects, (i) a probability distribution of one or more possible world configurations, (j) a continuous distribution of world configurations, (k) a continuous distribution of objects, (l) a plane of motion of the robot, and (m) dimensions of the robot, amongst other examples. In embodiments, speed and separation limits and limits for allowable harm may be based upon industry standards and/or regulations such as ISO standard 15066.

In embodiments that utilize object class, the object class can indicate a type or category of an object and embodiments may modify operations based upon the object class. For example, if the class is a person, collision severity is high, i.e., there is a great possibility of harm. If, however, the object class is a balloon, and a collision occurs, the balloon will likely move and there will be no damage to the balloon or robot. In such an embodiment, based on the collision severity, and how the robot is moving in proximity to the object, the torque may be adjusted to avoid collision with that object, i.e., add more safety margin if the object is of high value, like a person) or increase likelihood of collision (reduce safety margin to gain speed if the object is robust, such as a table surface).

In an embodiment of the method 330 where the context is at least one of: (1) a probability distribution of possible colliding objects, (2) a probability distribution of one or more possible world, i.e., obstacle configurations, (3) a continuous distribution of world, i.e., obstacle configurations, and (4) a continuous distribution of objects, the distributions indicate probability of contact between the robot and objects during the portion of the movement plan. In embodiments, a plurality of these probability distributions can be utilized at a given time. These probability distributions can then be used in determining the context specific torque at 333. For example, if a distribution indicates that collision between the robot and an object is highly probable, torque and force of the robot can be limited to mitigate the impact of any such collision. On the other hand, if a distribution indicates that a collision between the robot and an object is highly unlikely, the context specific torque and force can be higher.

Embodiments of the method 330 may utilize a variety of different techniques to identify the context of the portion of the movement plan at 332. In an embodiment, the context is identified by determining a likelihood of accident during the portion of the movement plan based on standards and/or regulations. These standards may set values speed and separation limits and allowable harm.

Another embodiment identifies the context by identifying expected resistance encountered by the robot during the portion of the movement plan using a model of an environment of the robot. For example, the model of the environment may indicate that the robot is cutting a piece of steel and, thus, high resistance is expected. To illustrate another example, consider the task of scooping guacamole from a container. The robot is expected to need varying joint torques to be applied based on the dynamics of the robot and whether the robot is moving in free-space versus scooping the guacamole. The different contexts can be predicted by a dynamics models of the robot. When the robot is in contact with the material, i.e., any portion of the end effector is on or below the surface of the material (guacamole), the torque is expected to be higher and is based on material properties (viscosity, frictions, density, etc.) and the dynamics of the motion (how fast, what surface area of the tool is presented to the material).

Yet another embodiment identifies context by processing context data using a neural network trained to determine if contact occurs during the portion of the movement plan. In such an embodiment, the neural network is trained on labeled context data that is labelled to indicate if contact occurs under conditions of the labelled context data. Such an embodiment may then determine if contact between the robot and an object occurs during the portion of the movement plan or the robot is operating in free space. Embodiments may utilize any neural network architecture known in the art such as fully connected networks, and long-short-term memory recurrent neural network.

Another embodiment may consider labels on a trajectory of the robot, i.e., whether a portion of the trajectory is labeled "contact" versus "no-contact," where "contact" allows for expected forces and torques to be exerted by the robot and "no-contact" does not. In such an embodiment, if, for example, context data indicates that contact is going to occur during a portion of a trajectory labelled "no-contact" at 333 when determining the context specific torque, the context specific torque may be lowered to prevent injuries caused by an unexpected contact.

According to another embodiment, identifying the context includes identifying physical objects in an environment of the robot to determine proximity of the robot to the physical objects during the portion of the movement plan. This may be done using a camera, depth sensor, lidar, or any other sensor know in the art that can detect objects in an environment. In such an embodiment, proximity can be based on the closest points of the objects.

Further, embodiments may determine the context at 332 by analyzing a computer based model of an environment of the robot to determine proximity of the robot to physical objects during the portion of the movement plan. In such an embodiment, proximity can be based on the closest points of the object and the robot represented in the model.

Yet another embodiment identifies the context by performing a computer-based simulation of an environment including the robot using (i) the movement plan, (ii) a computer-based model of the environment, and (iii) a computer-based model of the robot, to predict motion of the robot during the portion of the movement plan. Such an embodiment performs a simulation, e.g., a computer-aided design or computer-aided engineering simulation, or the like, to determine what occurs during the various portions of a movement plan of a robot. The results from such a simulation indicates the context of the portion of the movement plan. For instance, if in a large portion of the scenarios in the simulation, the robot made contact with an obstacle during a certain portion of the motion plan, then that portion would be considered to be high risk and require additional safety precautions or trigger more aggressive responses to human ingress or sound cues. Such an embodiment may also utilize models that are based on measured data of the environment.

Embodiments may also identify the context at 332 by processing data related to at least one of the robot, the task, the movement plan, and an environment of the robot using a neural network trained to determine the context of the portion of the movement plan given the data related to at least one of the robot, the task, the movement plan and the environment of the robot. Such a neural network can be trained using data collected from actions performed by a robot in a similar environment. In such an embodiment, the neural network can be trained to predict required and expected torque for a given trajectory. In an embodiment, these torques can indicate the context and can be used at 333 to determine the context specific torque.

Further, yet another embodiment of the method 330 determines the context at 332 by identifying a tool or a tool category being used by the robot during the portion of the movement plan. According to an embodiment, the tool may be identified by processing an image using a neural network classifier, reading a 2D graphic or text label, RFID, or human input. In an example embodiment, the identified tool or tool category may indicate a specific operating torque and, in determining the context specific torque at 333, the specific operating torque is determined to be the context specific torque. To illustrate, consider the example where the robot is using a specialized wrench for tightening bolts on a carbon fiber component. At 332, it can be identified that this specialized wrench is being used and, the specialized wrench can only be used at torques up to 15 N-m. Then, at 333, the context specific torque can be determined to be 15 N-m. It is noted that in such an embodiment, the context specific torque may still be limited by context, such as, whether there is a likelihood of collision.

Embodiments of the method 330 may also determine other context specific controls for the robot. One such example embodiment determines, based on the context identified at 332, a context specific velocity and a context specific position limit for the at least one aspect of the robot while the robot executes the portion of the movement plan. According to one such embodiment, the context specific torque, the context specific velocity, and the context specific position limit are computed by choosing limits which, based on a probability distribution, have a probability of safe operation in accordance with a specified standard or regulation. For example, embodiments may consider ISO standards that indicate the acceptable probability of collisions and the safe distance between a robot and an obstacle, e.g., human. In such an example of the method 330, the context specific torque, velocity, and position limit are determined at 333 to be in accordance with the ISO standard. Determining the probability of safe operation may consider a plurality of factors, such as communication lags (e.g., whether a robot is slow to receive or does not receive a message), camera failure rate (camera does not function), multiple camera reliability (what to do when cameras disagrees), errors in obstacle detection, speed, and separation limited as required by standards or regulations.

Embodiments of the method 330 may utilize a variety of techniques alone, or in combination to determine the context specific torque, the context specific velocity, and the context specific position limit.

One such embodiment uses a monte carlo analysis that determines a stopping distance of the robot, maximum allowed velocity of the robot, and maximum allowed torque of the robot by simulating one or more of: (i) object collisions, (ii) object detection rates, (iii) communication failures, and (iv) camera failures. In such an embodiment, the context specific torque, the context specific velocity, and the context specific position limit are based on the determined stopping distance, maximum allowed velocity, and maximum allowed torque.

Another embodiment implements a non-linear trajectory optimization using a collision probability and severity distribution as a cost function to directly compute a trajectory of the robot during the portion of the movement plan which minimizes collision costs. Such an embodiment uses non-linear optimization mathematical tools to minimize a function which correlates collision probability with a numerical score of collision severity which is determined by the user. According to an embodiment, the context specific torque, the context specific velocity, and the context specific position limit are based on the computed trajectory. For instance, the computed trajectory has a context specific torque, context specific velocity, and context specific position limit which are necessary to accomplish the trajectory and because the trajectory is based on minimizing collision costs, the torque, velocity, and position limit will likewise minimize collision costs.

In an embodiment that implements the non-linear trajectory optimization, the collision probability and severity distribution are generated from a simulation of possible ingressing objects, or from direct measurements of objects interacting with the robot. In such an embodiment, results of the simulation, or the measurements, are used to create a set of possible objects, or a function is fit to the results of the simulation or the measurements to generate the collision probability and severity distribution. In such an embodiment, data (measured data or from the simulations) is used to create scenarios against which collision costs can be computed. In embodiments described herein that utilize non-linear optimization or monte carlo analysis, the distribution of robot behavior and possible ingressing objects can be employed.

In another embodiment of the method 330, given the motion to be performed, and a physics-based model of the robot and the environment, the torque required for the motion can be predicted and recorded. This recorded torque can be used to generate motion of the robot and if the model of the robot and the environment is perfect, then no additional signals are required for the motion to be accomplished. In practice, the model is never perfect and thus additional corrections are often required. Such an embodiment may further include using a low-gain feedback controller to apply corrective torques to control tracking of the at least one aspect of the robot against a reference trajectory that is in accordance with context specific controls for the robot, such as a position limit, a velocity, an acceleration, and a torque. According to yet another embodiment, the context specific torque, the context specific velocity, and the context specific position are determined in accordance with velocity and torque limits required by a safety analysis. In such an embodiment, the feedback controller is designed based on tracking a desired trajectory of the robot and meeting the context specific torque, the context specific velocity, and the context specific position limit. According to an embodiment, the desired trajectory may be in accordance with robot acceleration and jerk limits.

Another embodiment of the method 330 identifies the context of the portion of the movement plan at 332 by detecting, with at least one sensor, at least one obstacle in an environment of the robot. In such an embodiment, at least one of the context specific torque, the context specific velocity, and the context specific position limit are determined at 333 to avoid collision between the robot and the detected obstacle. According to another embodiment, identifying the context at 332 includes continuously computing a current stopping distance of the robot to evaluate an instantaneous torque limit, velocity limit, and acceleration limit based on appearance of previously unknown obstacles in an environment including the robot. In such an embodiment, the context identified at 332 includes the computed current stopping distance.

Another embodiment employs a feed-forward torque controller to generate motion of the robot. Such an embodiment uses a collision severity and probability density function as a cost function for the feed-forward torque controller to determine a trajectory of the robot which has a low probability of causing a collision, given a modeled likelihood of unknown objects appearing in a workspace of the robot. This functionality for determining a trajectory may be used at 332 for determining the context of the robot. Then, knowing the trajectory of the robot has a low probability of collision, an appropriate torque can be determined at 333 in order to make the trajectory satisfy at least one criterion, such as execution time.

As described herein, embodiments control at least one aspect of the robot. In embodiments, this "aspect" may be any aspect of the robot, such as a joint, a hydraulic system, an electric actuator, an air driven actuator, or an end effector tool, amongst other examples.

Embodiments, such as the method 330 may also consider sound and context as described in U.S. Patent Application titled "Stopping Robot Motion Based On Sound Cues", Ser. No. 16/571,025 when identifying context of a portion of a movement and when determining context specific controls for the robot. Likewise, in embodiments, context may also include predicted motion of objects as described in U.S. Patent Application titled "Robot Interaction With Human Co-Workers", Ser. No. 16/570,606. Similarly, embodiments may consider modified motion of a robot as described in U.S. Patent Application titled "Stopping Robot Motion Based On Sound Cues", Ser. No. 16/571,025 and U.S. Patent Application titled "Robot Interaction With Human Co-Workers", Ser. No. 16/570,606 when determining context specific controls for a robot as described herein.

Figure 4:
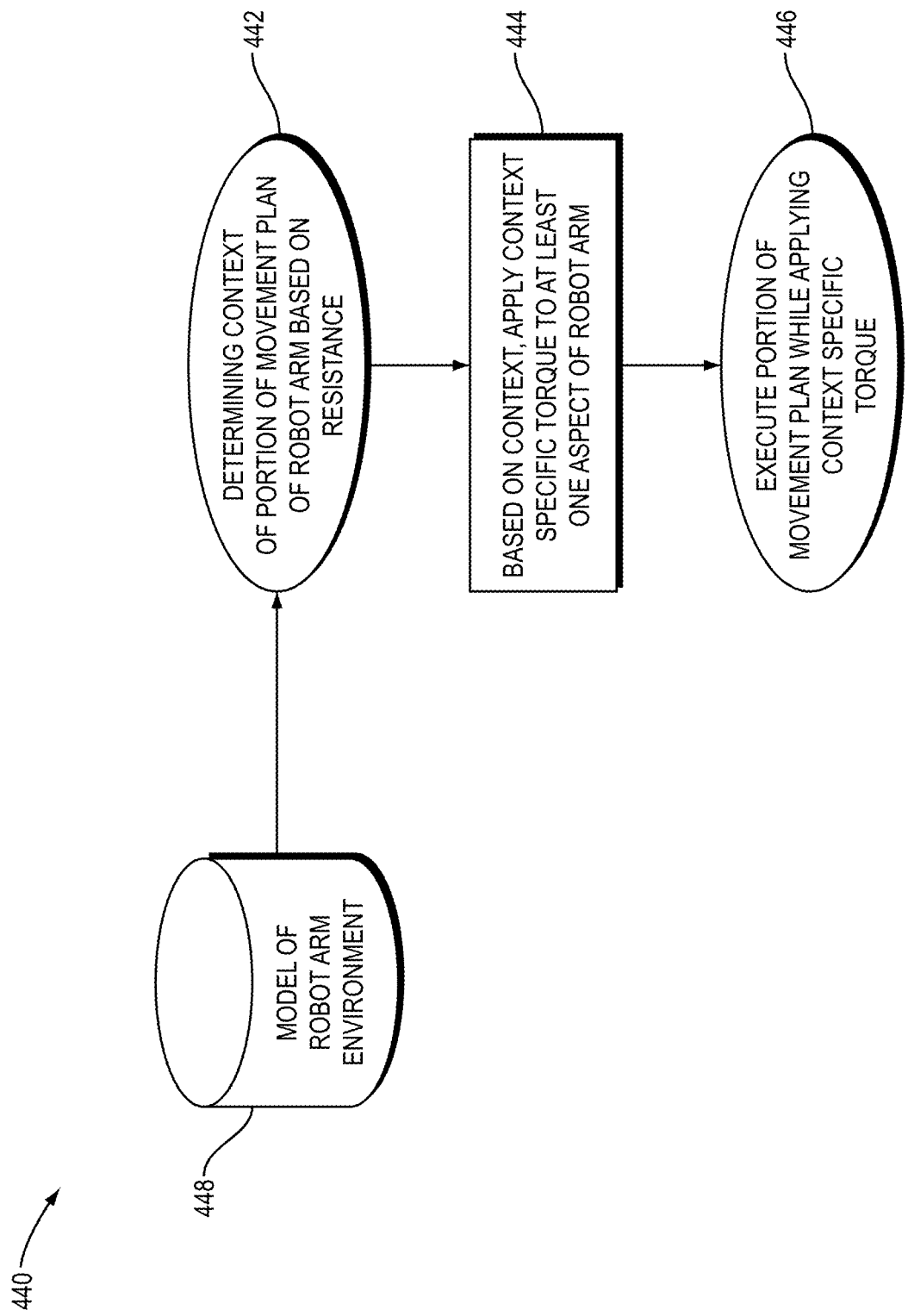
FIG. 4 is flow diagram illustrating an example embodiment of a method of the present disclosure.

FIG. 4 is a flow diagram illustrating an example embodiment of a method 440 of the present disclosure. Based on a model of a robot environment (448), the method determines a context of a portion of a movement plan of a robot arm based on resistance (442). The resistance is determined based on the model (448). Based on the determined context, the method applies context specific torque to at least one aspect (e.g., joint, hydraulic force, end effector unit) of the robot arm (444). The method then executes a portion of the movement plan while applying the context specific torque (446).

In an embodiment of the present disclosure, based on a dynamic model of the robot, a feed-forward torque (e.g., the minimum required torque to move the robot forward at a given velocity) is computed for movement in free space. From this calculated feed-forward torque, an embodiment can detect collisions. Such an embodiment can further compare the robot position with an expected position reached by applying this calculated feed-forward torque. Therefore, an accidental collision is detected as deviations from the expected robot position. Alternatively, a collision can be detected during robot movement by means of measuring the external torques (e.g., difference between applied torque and measured torque) of the robot joints by means of embedded joint torque sensors.

Once a collision is detected, robot movement can be stopped. Optionally, a safe zero-torque command with gravity compensation can be issued. In this state, the robot can be moved away from the obstacle by hand. In cases where the robot can pinch a body part, this is a safer solution than solely halting the robot motion, because the robot can be manually maneuvered away from the pinched body part.

Furthermore, robot torque and velocity can be limited based on the current velocity and distance to collision with static obstacles based on a model of the environment with known obstacles. In such an embodiment, the robot can be controlled so that the robot does not exert torque when a collision with an obstacle is predicted or anticipated. Optionally, moving obstacles can be detected by means of a sensor or array of sensors. Maximum allowed acceleration can also be calculated as a function of distance to collision and weighted by a probability distribution of a potential obstacle being present.

In an embodiment, from a given distance to collision dx, of a newly sensed obstacle, a dynamic model of the robot translates to a local maximum allowed torque to avoid a high probability of collision. The robot may reduce its velocity in order to have sufficient margin to stop before collision if the motion of the object is not known. For example, when a human (or other object) moves into the path of the robot while the robot is executing a trajectory, the robot slows to a halt as the distance to collision approaches zero. The robot can either wait for the human/obstacle to move out of the planned path, or plan a new trajectory. If a collision cannot be avoided by applying the maximum negative acceleration of the robot joint(s), an emergency stop command may be issued that triggers the robot emergency brake.

Embodiments can also modify robot operations based on a pre-computed motion plan. For instance, the robot torque and velocity can be limited based on the position of the robot in the pre-computed motion plan. To illustrate, for a robot scooping ice cream, the part of the trajectory that involves expected contact with the ice cream can have a pre-computed torque limit that is higher than while the robot is traversing free space.

Alternatively, the robot torque and velocity can be dynamically set in real-time based on current robot location (e.g. position of the end effector tool) and a model of the environment. In the ice cream scooping example, the torque limit is set higher when the position of the end effector tool is inside the ice cream bin. However, this can change dynamically, as the amount of material in the bin can change. For example, when scooping a full bin, the robot torque would need to be high when entering the bin containing the ice cream. However, in a mostly empty bin, low torque can be used inside of the volume of the bin until the scooper contacts the ice cream. A model of the shape of the remaining ingredients (e.g., ice cream) can be used as the context and, thus, to inform the amount of torque applied (i.e., the context specific torque), where each subsequent scoop or other action of the same ingredient or material may have a different context specific torque.

A system embodiment includes a robot arm with optional embedded torque sensors. A controller, processor, database, or other module can include a dynamic model of a robot. The model of the robot includes context specific torques to apply at each robot joint or other motor. The system can further include a model of the environment that represents known obstacles. The model of the environment can dynamically change as obstacles and the environment change. A system embodiment may also include a robot arm controller that, optionally, accepts torque and velocity limits as dynamic settings. The system can further optionally include sensors to detect moving obstacles, and in response, those detections dynamically change the environment model. Such a sensor can be a structured light depth camera, sonar, radar, lidar, stereo vision, or RGB camera from which depth is inferred.

In contrast with embodiments, existing methods set the torque limit while traversing free space to be the torque required to move each respective joint at maximum velocity. In contrast, context specific torque limits determined in embodiments provide a simpler, less conservative, and safer approach than computing the torque limit at each time step using the minimum required torque for a given trajectory as the torque limit.

Existing methods do not disclose system embodiments, method embodiments, or solutions described herein. For example, existing solutions stop a robot only after sensing a collision with a foreign object. Some current industrial robotics applications detect when a human enters a robot operating zone and halt motion, or provide physical barriers that protect workers from the robot, but do not allow humans to work in the vicinity of the robot (see, e.g., "The Shrinking Footprint of Robot Safety" from Robotic Industries Association, Robotics Online, https://www.robotics.org/content-detail.cfm/Industrial-Robotics-Industry-Insights/The-Shrinking-Footprint-of-Robot-Safety/content id/5059).

An advantage of an embodiment is that employing context to dynamically set robot operations, e.g., torque and velocity, and restricting the area where high torque can be exerted, allows for closer collaboration between robot and human co-workers while mitigating the risk of bodily damage. Existing methods stop robot motion when a collision occurs or is likely to occur, or stop robot motion entirely when a human is in the vicinity of the robot. An improvement of embodiments is dynamically limiting the torque the robot can exert while executing a trajectory, based on distance to collision.

Another advantage is that embodiments can switch the robot to zero torque mode with gravity compensation when a collision is detected. This allows the robot to be freely maneuvered by hand by simply pushing/exerting pressure on the robot arm. Gravity compensation is a force provided by one or more joints of the robot that counters the force of gravity on the robot, making the robot easier to move by a human. This approach is safer than bringing the robot to a rigid stop because the risk of crushing, pinching of body parts, or secondary contact injuries is reduced.

Embodiments can determine the context specific torque based on the likelihood of contact between the robot and an object. The likelihood of contact can be a product of speed and separation monitoring performed by a system in accordance with a standard, such as ISO 15066. For example, if the robot is holding a knife and moving through free space from a tool rack to a cutting board, the context specific torque can be limited by how quickly the robot can detect a person entering the workspace or if the workspace is gated. However, when the robot is in contact with a steak and no person is detected, the context specific torque can be set much higher to allow the robot to cut the steak.

Embodiments may also identify the required forces and torques to accomplish the task, identify the context, and determine the context specific torque using neural networks. In such an embodiment, neural networks can be trained using data collected from actions performed by a robot in a similar environment. In such an embodiment, the neural networks can be trained to predict required and expected torque for a given trajectory and these torques can be determined to be the required torques for the task. Similarly, a neural network can be trained to determine context, e.g., predict the likelihood of a dangerous event, based on context data. Such a neural network is trained using labelled example data from past operations of the robot. Likewise, a neural network can be trained to determine a context specific torque based on the determined force and torque to accomplish the task and the determined context.

Figure 5:
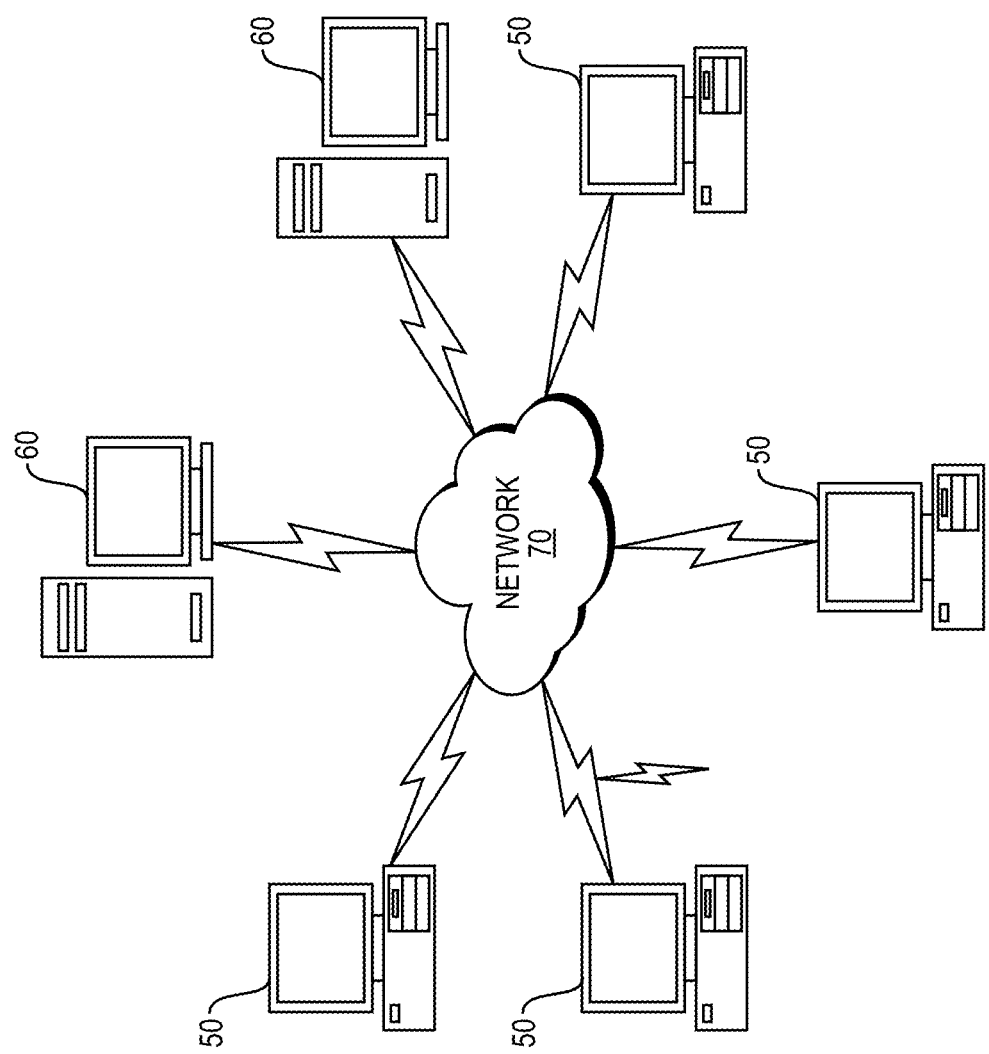
FIG. 5 depicts a computer network or similar digital processing environment in which embodiments of the present disclosure may be implemented.

FIG. 5 illustrates a computer network or similar digital processing environment in which embodiments of the present disclosure may be implemented.

Client computer(s)/devices 50 and server computer(s) 60 provide processing, storage, and input/output devices executing application programs and the like. The client computer(s)/devices 50 can also be linked through communications network 70 to other computing devices, including other client devices/processes 50 and server computer(s) 60. The communications network 70 can be part of a remote access network, a global network (e.g., the Internet), a worldwide collection of computers, local area or wide area networks, and gateways that currently use respective protocols (TCP/IP, Bluetooth®, etc.) to communicate with one another. Other electronic device/computer network architectures are suitable.

Figure 6:
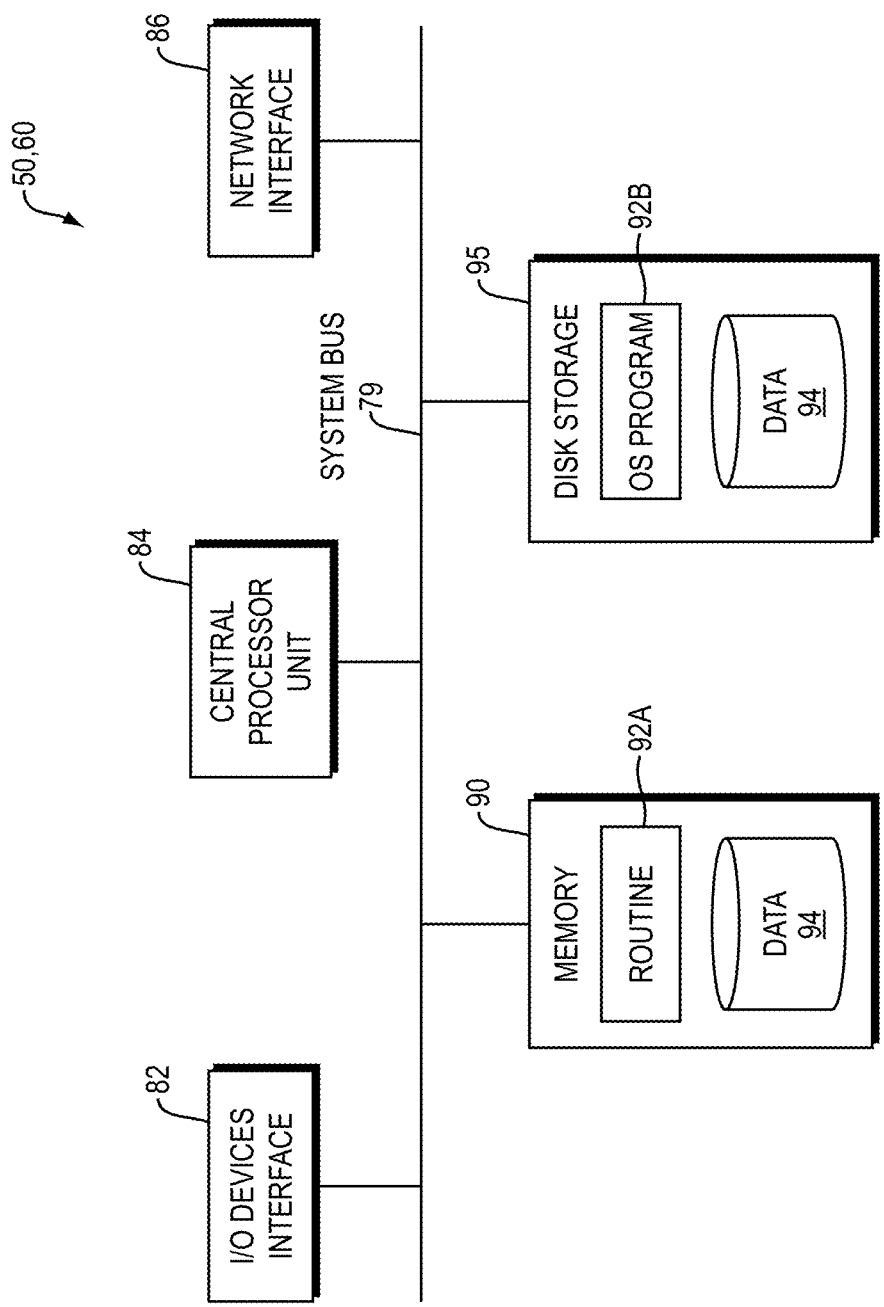
FIG. 6 is a diagram of an example internal structure of a computer in the environment of FIG. 5.

FIG. 6 is a diagram of an example internal structure of a computer (e.g., client processor/device 50 or server computers 60) in the computer system of FIG. 5. Each computer 50, 60 contains a system bus 79, where a bus is a set of hardware lines used for data transfer among the components of a computer or processing system. The system bus 79 is essentially a shared conduit that connects different elements of a computer system (e.g., processor, disk storage, memory, input/output ports, network ports, etc.) that enables the transfer of information between the elements. Attached to the system bus 79 is an I/O device interface 82 for connecting various input and output devices (e.g., keyboard, mouse, displays, printers, speakers, etc.) to the computer 50, 60. A network interface 86 allows the computer to connect to various other devices attached to a network (e.g., network 70 of FIG. 5). Memory 90 provides volatile storage for computer software instructions 92 and data 94 used to implement an embodiment of the present disclosure. Disk storage 95 provides non-volatile storage for computer software instructions 92 and data 94 used to implement an embodiment of the present disclosure. A central processor unit 84 is also attached to the system bus 79 and provides for the execution of computer instructions.

In one embodiment, the processor routines 92 and data 94 are a computer program product (generally referenced 92), including a non-transitory computer-readable medium (e.g., a removable storage medium such as one or more DVD-ROM's, CD-ROM's, diskettes, tapes, etc.) that provides at least a portion of the software instructions for an embodiment. The computer program product 92 can be installed by any suitable software installation procedure, as is well known in the art. In another embodiment, at least a portion of the software instructions may also be downloaded over a cable communication and/or wireless connection. In other embodiments, the invention programs are a computer program propagated signal product embodied on a propagated signal on a propagation medium (e.g., a radio wave, an infrared wave, a laser wave, a sound wave, or an electrical wave propagated over a global network such as the Internet, or other network(s)). Such carrier medium or signals may be employed to provide at least a portion of the software instructions for the present invention routines/program 92.

The teachings of all patents, published applications and references cited herein are incorporated by reference in their entirety.

While example embodiments have been particularly shown and described, it will be understood by those skilled in the art that various changes in form and details may be made therein without departing from the scope of the embodiments encompassed by the appended claims.

What is claimed is:

1. A method comprising:
identifying a respective minimum force and a respective minimum torque for a robot to execute each portion of a plurality of portions of a movement plan indicating motion of the robot to perform a task in an environment;
receiving real-time data from one or more sensors in the environment;
identifying a respective context of each portion of the plurality of portions of the movement plan using the received real-time data;
based on the identified respective minimum force, respective minimum torque, and the respective context, determining a respective context specific torque for each of the plurality of portions, for at least one aspect of the robot, while the robot executes each portion of the movement plan; and
modifying the motion plan to control at least one aspect of the robot to operate in accordance with each respective determined context specific torque.

2. The method of claim 1, wherein modifying the motion plan comprises:
controlling the at least one aspect of the robot to operate by limiting the at least one aspect to each respective determined context specific torque.

3. The method of claim 1, wherein identifying the respective context of each portion of the movement plan comprises at least one of:
determining a likelihood of accident during at least one portion of the movement plan based on standards for (i) speed and separation limits and (ii) allowable harm;
identifying expected resistance encountered by the robot during at least one portion of the movement plan using a model of the environment;
processing context data using a neural network, trained on labeled context data indicating if contact occurs under conditions of the labeled context data, to determine if contact occurs during at least one portion of the movement plan;
identifying physical objects in the environment to determine proximity of the robot to the physical objects during at least one portion of the movement plan;
analyzing a computer based model of the environment to determine proximity of the robot to physical objects during at least one portion of the movement plan;
performing a computer-based simulation of the environment using (i) the movement plan, (ii) a computer-based model of the environment, and (iii) a computer-based model of the robot, to predict motion of the robot during at least one portion of the movement plan;
processing data related to at least one of the robot, the task, the movement plan and the environment using a neural network trained to determine respective context of at least one portion of the movement plan given the data related to at least one of the robot, the task, the movement plan and the environment of the robot; and
identifying a tool or a tool category being used by the robot during at least one portion of the movement plan.

4. The method of claim 1, wherein identifying the respective context of each portion of the movement plan comprises identifying a tool or a tool category being used by the robot during at least one portion of the movement plan and the identified tool or tool category indicates a specific operating torque and where the received real-time data and the specific operating torque are used in determining a respective context specific torque for the at least one portion.

5. The method of claim 1, wherein the identified context for at least one portion is at least one of: (a) free space, (b) active contact, (c) collision, (d) anticipated collision, (e) a likelihood of accident during the at least one portion of the movement plan based on standards for (1) speed and separation limits and (2) allowable harm, (f) the task performed by the robot, (g) a set of possible colliding objects, where each object has an object class, and the object class indicates a severity of a collision with the object, (h) a probability distribution of possible colliding objects, (i) a probability distribution of one or more possible world configurations, (j) a continuous distribution of world configurations, and (k) a continuous distribution of objects.

6. The method of claim 5, wherein at least one of the probability distribution of possible colliding objects, the probability distribution of one or more possible world configurations, the continuous distribution of world configurations, and the continuous distribution of objects indicate probability of contact between the robot and objects during the at least one portion of the movement plan.

7. The method of claim 1, further comprising:
based on a given respective identified context, determining a context specific velocity and a context specific position limit for the at least one aspect of the robot while the robot executes at least one portion of the movement plan.

8. The method of claim 7, wherein a given respective context specific torque, the context specific velocity, and the context specific position limit are computed by choosing limits which, based on a probability distribution, have a probability of safe operation in accordance with a specified standard.

9. The method of claim 7, wherein a given respective context specific torque, the context specific velocity, and the context specific position limit are determined using at least one of:
a monte carlo analysis that determines a stopping distance of the robot, maximum allowed velocity of the robot, and maximum allowed torque of the robot by simulating one or more of object collisions, object detection rates, communication failures, and camera failures, wherein the given respective context specific torque, the context specific velocity, and the context specific position limit are based on the determined stopping distance, maximum allowed velocity, and maximum allowed torque; and
a non-linear trajectory optimization using a collision probability and severity distribution as a cost function to directly compute a trajectory of the robot during at least one portion of the movement plan which minimizes collision costs wherein the given respective context specific torque, the context specific velocity, and the context specific position limit are based on the computed trajectory.

10. The method of claim 9, wherein the collision probability and severity distribution is generated from a simulation of possible ingressing objects, or from direct measurements of objects interacting with the robot, wherein results of the simulation or the measurements are used to create a set of possible objects, or a function is fit to the results of the simulation or the measurements to generate the collision probability and severity distribution.

11. The method of claim 7 wherein feed-forward torque is used to generate motion of the robot and the method further comprises:
using a low-gain feedback controller implementing the feed-forward torque to control tracking of the at least one aspect of the robot against a reference trajectory that is in accordance with at least one of the context specific position limit, the context specific velocity, acceleration, and a given respective context specific torque.

12. The method of claim 11, wherein the given respective context specific torque, the context specific velocity, and the context specific position limit are determined in accordance with velocity and torque limits required by a safety analysis and the feedback controller is designed based on tracking a desired trajectory of the robot and meeting the given respective context specific torque, the context specific velocity, and the context specific position limit.

13. The method of claim 7, wherein:
identifying the given respective context of the at least one portion of the movement plan includes detecting, with the one or more sensors, at least one obstacle in the environment of the robot; and
wherein, at least one of a given respective context specific torque, the context specific velocity, and the context specific position limit are determined to avoid collision between the robot and the detected obstacle.

14. The method of claim 1, wherein identifying a respective context of each portion of the movement plan comprises:
continuously computing a current stopping distance of the robot to evaluate an instantaneous torque limit, velocity limit, and acceleration limit based on appearance of previously unknown obstacles in the environment including the robot, wherein at least one identified context includes the computed current stopping distance.

15. The method of claim 1, wherein a feed-forward torque controller is employed to generate motion of the robot and the method further comprises:
using a collision severity and probability density function as a cost function for the feed-forward torque controller, determining a trajectory of the robot which has a low probability of causing a collision, given a modeled likelihood of unknown objects appearing in the environment.

16. The method of claim 1, wherein the at least one aspect of the robot is one of a joint, a hydraulic system, an electric actuator, an air driven actuator, or an end effector tool.

17. A system comprising:
a processor; and
a memory with computer code instructions stored thereon, the processor and the memory, with the computer code instructions, being configured to cause the system to:
identify a respective minimum force and a respective minimum torque for a robot to execute each portion of a plurality of portions of a movement plan indicating motion of the robot to perform a task in an environment;
receive real-time data from one or more sensors in the environment;
identify a respective context of each portion of the plurality of portions of the movement plan using the received real-time data;
based on the identified respective minimum force, respective minimum torque, and the respective context, determine a respective context specific torque for each of the plurality of portions, for at least one aspect of the robot, while the robot executes each portion of the movement plan; and
modify the motion plan to control at least one aspect of the robot to operate in accordance with each respective determined context specific torque.

18. The system of claim 17 wherein, in modifying the motion plan, the processor and the memory, with the computer code instructions, are configured to cause the system to:
control the at least one aspect of the robot to operate by limiting the at least one aspect to each respective determined context specific torque.

19. A non-transitory computer program product comprising a computer-readable medium with computer code instructions stored thereon, the computer code instructions being configured, when executed by a processor, to cause an apparatus associated with the processor to:
identify a respective minimum force and a respective minimum torque for a robot to execute each portion of a plurality of portions of a movement plan indicating motion of the robot to perform a task in an environment;
receive real-time data from one or more sensors in the environment;
identify a respective context of each portion of the plurality of portions of the movement plan using the received real-time data;
based on the identified respective minimum force, respective minimum torque, and the respective context, determine a respective context specific torque for each of the plurality of portions, for at least one aspect of the robot, while the robot executes each portion of the movement plan; and modify the motion plan to control the at least one aspect of the robot to operate in accordance with each respective determined context specific torque.

\* \* \* \* \*

UNITED STATES PATENT AND TRADEMARK OFFICE
CERTIFICATE OF CORRECTION

| | | |
|---|---|---|
| PATENT NO. | : 11,597,084 B2 | |
| APPLICATION NO. | : 16/570736 | |
| DATED | : March 7, 2023 | |
| INVENTOR(S) | : David M. S. Johnson et al. | |

It is certified that error appears in the above-identified patent and that said Letters Patent is hereby corrected as shown below:

On the Title Page

In the inventor item (72), at Line 4, after "(US)" please insert --; Mitchell Hebert, Littleton, CO (US)--

Signed and Sealed this
Second Day of May, 2023

Katherine Kelly Vidal
*Director of the United States Patent and Trademark Office*